(12) United States Patent
Voloshin

(10) Patent No.: US 12,519,366 B1
(45) Date of Patent: Jan. 6, 2026

(54) ELECTROMAGNETIC MOTOR AND ELECTRIC POWER GENERATING SYSTEM BASED ON IT

(71) Applicant: Alexander Grigoryevich Voloshin, Tarzana, CA (US)

(72) Inventor: Alexander Grigoryevich Voloshin, Tarzana, CA (US)

( * ) Notice: Subject to any disclaimer, the term of this patent is extended or adjusted under 35 U.S.C. 154(b) by 0 days.

(21) Appl. No.: 16/824,608

(22) Filed: Mar. 19, 2020

Related U.S. Application Data

(60) Provisional application No. 62/822,873, filed on Mar. 23, 2019.

(51) Int. Cl.
*H02K 7/04* (2006.01)
*H02K 16/04* (2006.01)

(52) U.S. Cl.
CPC .............. *H02K 7/04* (2013.01); *H02K 16/04* (2013.01)

(58) Field of Classification Search
CPC ............ H02K 7/00; H02K 7/04; H02K 16/00; H02K 16/04; H02K 49/00; H02K 49/104; H02K 1/00; H02K 1/27; H02K 11/00; H02K 53/00

See application file for complete search history.

(56) References Cited

U.S. PATENT DOCUMENTS

| | | | | |
|---|---|---|---|---|
| 6,384,503 | B1* | 5/2002 | Iwaki ................... | H02K 1/2791 310/156.47 |
| 2002/0175588 | A1* | 11/2002 | Rajasingham ........... | H02K 3/04 310/179 |
| 2003/0173849 | A1* | 9/2003 | Marshall, Jr. .......... | H02K 53/00 310/156.01 |
| 2004/0041474 | A1* | 3/2004 | Lunz .................... | H02K 41/031 310/13 |

* cited by examiner

*Primary Examiner* — Tran N Nguyen

(57) ABSTRACT

The present invention comprises a primary electromagnetic motor with permanent magnets utilizing the energy of permanent magnets to produce mechanical rotation and an electric power generating system based on it. The electromagnetic motor has multiple rotors and stators in a form of wheels and disks with multiple permanent magnets arranged on them. The timing and shaping of relative magnetic fields of the rotors and stators producing mechanical rotation is accomplished with the proper geometrical shaping and interconnection of the elements. The wheels have a shape of twisted cylinders, such as Mobius Strips or paradromic rings. Permanent magnets arranged on the stators and rotors surfaces affixed to the inner and/or outer periphery of the Mobius Strip or disk. The primary electromagnetic motor is connected to the electric generator to produce electricity. This electricity is then used to empower larger secondary electromagnetic motor with the rotors and stators of the same Mobius Strips shape and geometry but with electromagnets that produces mechanical force strong enough to empower independent power plant to be used for residential, agricultural, and commercial applications.

12 Claims, 24 Drawing Sheets

$$\begin{cases} x = \left(R + s \cdot \cos\dfrac{n\theta}{2}\right) \cdot \cos\theta, \\ y = \left(R + s \cdot \cos\dfrac{n\theta}{2}\right) \cdot \sin\theta, \\ z = s \cdot \sin\dfrac{n\theta}{2}, \end{cases} \quad (1)$$

where $s \in \left[-\dfrac{w}{2}, \dfrac{w}{2}\right]$, $\theta \in [0, 2\pi]$.

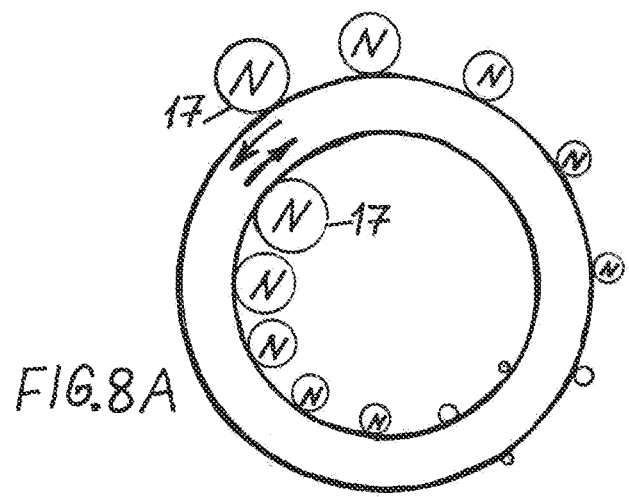
FIG. 8A
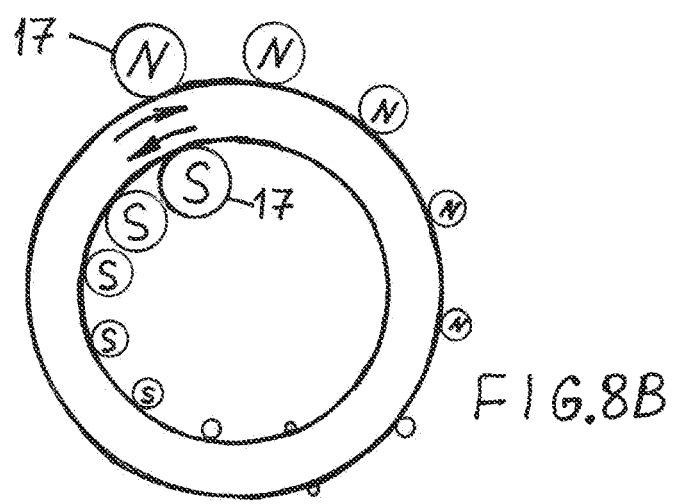
FIG. 8B
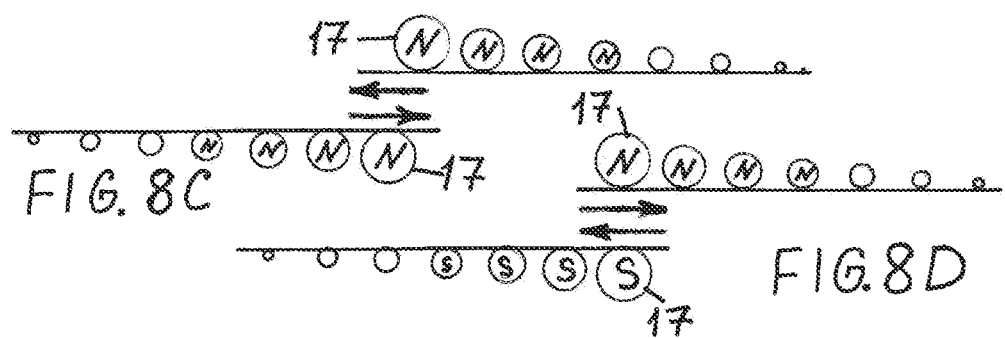
FIG. 8C
FIG. 8D

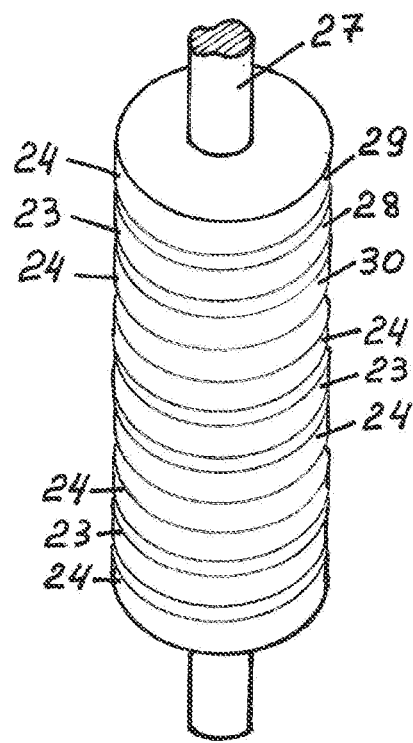
FIG.16A
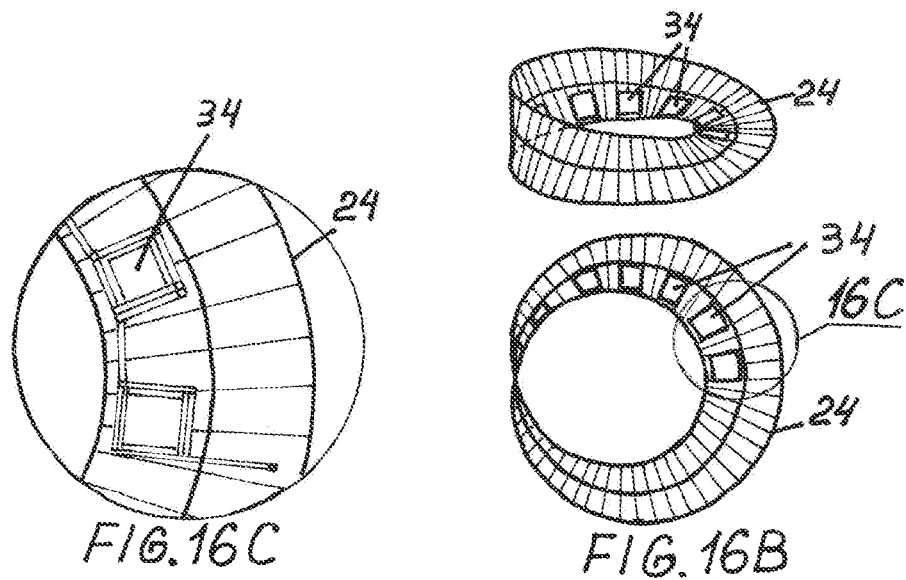
FIG.16C
FIG.16B

ELECTROMAGNETIC MOTOR AND ELECTRIC POWER GENERATING SYSTEM BASED ON IT

CROSS-REFERENCE TO RELATED APPLICATIONS

This application claims the benefit of U.S. Provisional Patent Application No. 62/822,873, filed Mar. 23, 2019, which is incorporated by reference herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT VIA THE OFFICE ELECTRONIC FILING SYSTEM (IFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present invention relates to the field of electrical machines and devices. More particularly, the invention relates to electromagnetic motors and devices with permanent magnets and/or electromagnets.

Background

Conventional electromagnetic motors convert electrical energy to the mechanical energy of rotation or linear motion by utilizing electromagnetic forces between stationary (stators) and moving parts (rotors). They may include permanent magnets in stators or rotors, but have to have electromagnets with winding and coils on stator, or rotor, or both in order to create electromagnetic forces of repulsion, or attraction, or both to inflict a force upon rotor to achieve rotation or to be moved in a linear path.

As a source of electromagnetic energy permanent magnets and electromagnets are essentially the same. In electromagnets energy is created by changing electric energy into magnetic energy using electric wiring and external source of electricity. In permanent magnets energy is created on the quantum atomic level (there are several theories about the nature of that energy known to modern science).

The important difference (in regards to using them in electromagnetic devices) is that in electromagnets the polarity of magnetic field (as well as a magnitude of magnetic force) can be easily switched by switching the direction of electric current in wiring (or its strength).

The goal is to create a way to achieve such an effect of a change of the magnetic force polarity and magnitude in the system with permanent magnets. The solution is to find a configuration of the permanent magnets system that will provide a change of the polarity and relative strength of some permanent magnets in relation to others in such a way that permanent magnetic system may be utilized as a source of the mechanical motion force.

To my knowledge, previous works done with permanent magnets systems and electromagnetic devices have not achieved the necessary results.

The electromagnets are able to create extremely large magnetic fluxes and strong magnetic forces, much stronger than permanent magnets are able to achieve. However, modern permanent magnets are able to provide magnetic force strong enough to create desired mechanical motion.

Modern permanent magnets create strong undepleted magnetic force of repulsion and attraction and the important object of this invention is to utilize this force to produce electromagnetic motor.

BRIEF SUMMARY OF THE INVENTION

The invention describes a rotative electromagnetic motor, though in the practice of the inventive concept linear motor may be produced.

The invention relates to electromagnetic motors and devices with magnets. It is an object of this invention to utilize the energy of magnets to produce consistent mechanical movement by magnetic forces of magnets. It is an object of this invention to provide proper geometrical configuration and relationship of the system elements to achieve efficient change of the magnetic energy of magnets to the mechanical motion energy that can be used to create electricity (or other mechanical work as needed).

The electromagnetic motor has multiple stators and rotors in the form of wheels and disks that can be mounted on the same or separate shafts. The wheels are made in the shape of twisted cylinders, such as Mobius Strips or paradromic rings. Multiple magnets arranged on the stators and rotors.

The magnetic system always strives for balance and is trying to reach a state of equilibrium. In the unbalanced state magnetic forces of attraction and repulsion move the system to the balanced position. The geometry of the Mobius Strips (further, for the description of the twisted cylinders, such as Mobius Strip and paradromic rings we will use the termin Mobius Strip instead, since all of the varieties can be described as the modifications of the Mobius Strips) along with the correct placement of the magnets on the armature surfaces and complementary arrangement of the rotors and stators permit to achieve important requirements to the magnetic system with magnets arrangements in order to produce consistent mechanical movement:

1. Constantly changing relative gradient of the magnetic force of magnets of the interacting rotors and stators to provoke relative movement due to repulsive and attractive forces of unbalanced magnetic configuration, and
2. Eliminating or neutralizing the impact of the zones of magnetic equilibrium, or "dead zones", where moving elements can slow down and/or stop.

Means are disclosed for producing relative displacement between the stators and rotors to adjust the magnets alignment and thereby regulate the magnitude of the magnetic forces imposed upon the rotor magnets. In this manner the speed of the rotation may be regulated and the system may be turned on and/or off.

Still, other objects and advantages of the present invention will become readily apparent to those skilled in this art from the following detailed description, wherein the preferred embodiments of the invention is shown, as described simply by way of illustration of the best mode contemplated of carrying out the invention. As will be realized, the inventions capable of other and different embodiments, and its several details are capable of modifications in various obvious respects, all without departing from the invention. Accordingly the drawings and the description are to be regarded as illustrative in nature, and not as restrictive.

BRIEF DESCRIPTION OF THE SEVERAL VIEWS OF THE DRAWINGS

Some images are simplified in order to present a clear illustration of the three-dimensional effects on the two-dimensional plane. The present invention will be described with reference to the attached drawings as non-limiting examples only, in which:

FIG. 2A—Parameterized one half-twisted Mobius Strip, isometric view.

FIG. 2B—Three dimensional space Cartesian Coordinates.

FIG. 8A—Balanced position of the system with the same polarity gradients interaction, rotational interpretation.

FIG. 8B—Balanced position of the system with the opposite polarity gradients interaction, rotational interpretation.

FIG. 8C—Balanced position of the system with the same polarity gradients interaction, linear interpretation.

FIG. 8D—Balanced position of the system with the opposite polarity gradients interaction, linear interpretation.

FIG. 16A—Secondary electromagnetic motor with the Mobius Strip shaped stators and/or rotors.

FIG. 16B—Electromagnets arrangements on the Mobius Strip shaped stators' armature of the secondary electromagnetic motor.

FIG. 16C—Electromagnets arrangements on the Mobius Strip shaped stators' armature of the secondary electromagnetic motor, enlarged detailed view.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context is clearly indicated otherwise. It will be further understood that the terms "comprises" and/or "comprising" and/or their synonyms, when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal form unless expressly so defined herein. For instance, the term "armature" may be used to describe the rotors and stators of the electromagnetic motor and it means carcass, supporting structure, armature, or frame.

In describing the invention, it will be understood that the number of techniques and steps are disclosed. Each of this has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New electromagnetic motor and electric power generating system based on it are discussed herein. In the following description, for the purpose of explanation, numerous specific details are set force in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1A:
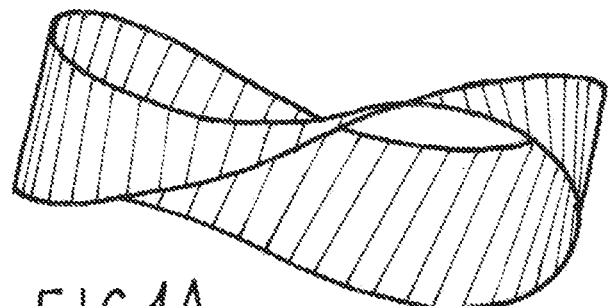
FIG. 1A—One-half twisted right-handed Mobius Strip shaped rotor/stator armature, side view.
Figure 1B:
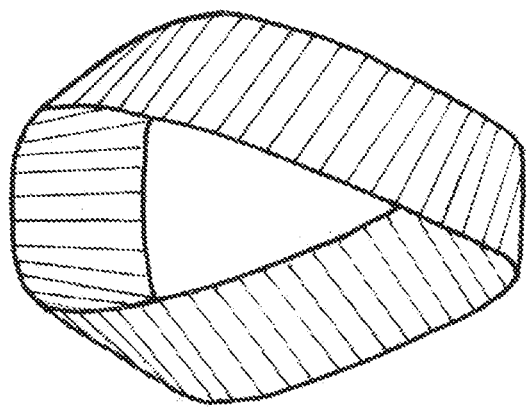
FIG. 1B—One-half twisted right-handed Mobius Strip shaped rotor/stator armature, top view.
Figure 1C:
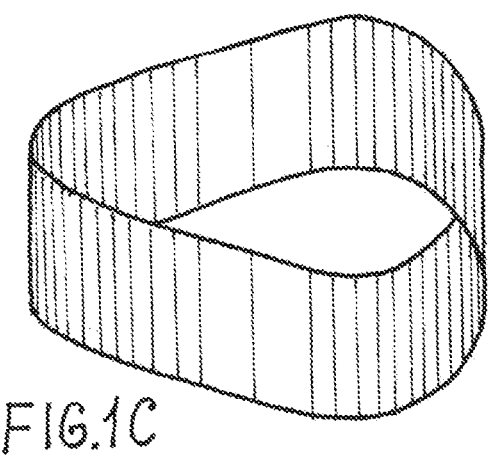
FIG. 1C—Two-half twisted right-handed Strip shaped rotor/stator armature.
Figure 1D:
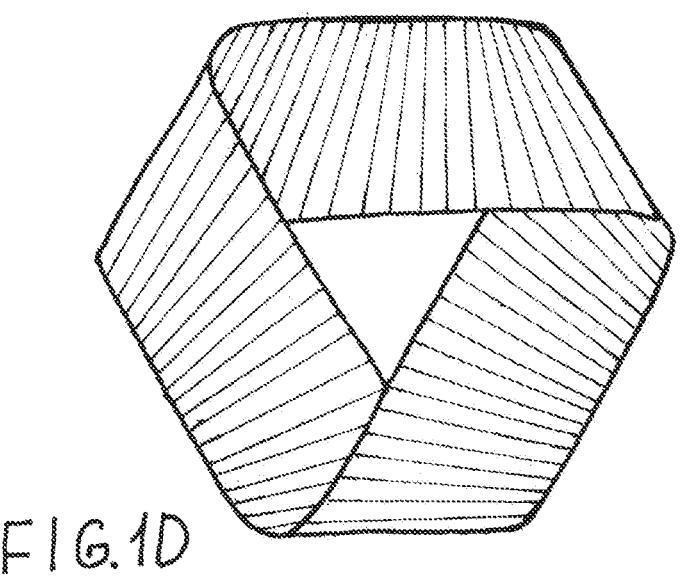
FIG. 1D—Three-half twisted right-handed Mobius Strip shaped rotor/stator armature.
Figure 1E:
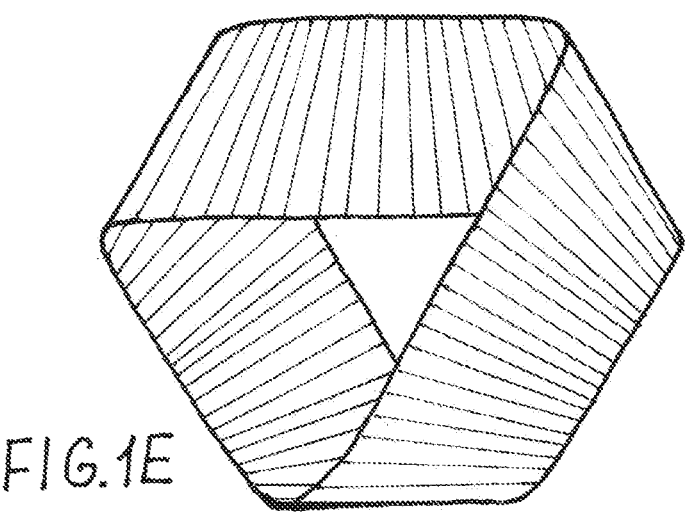
FIG. 1E—One-half twisted left-handed Mobius Strip shaped rotor/stator armature.
Figure 1F:
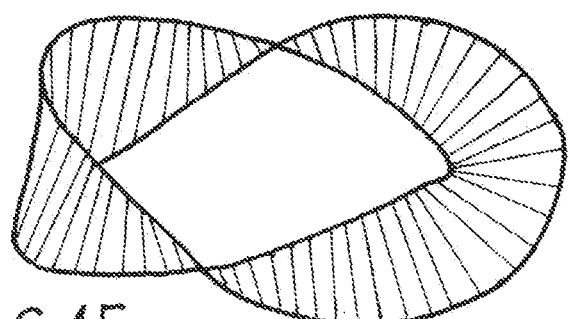
FIG. 1F—Different three dimensional embodiment of three-half twisted Mobius Strips shaped rotor/stator armature, right-handed.
Figure 1G:
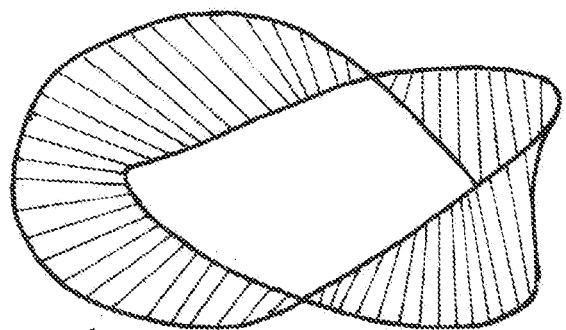
FIG. 1G—Different three dimensional embodiment of three-half twisted Mobius Strips shaped rotor/stator armature, left-handed.
Figure 1H:
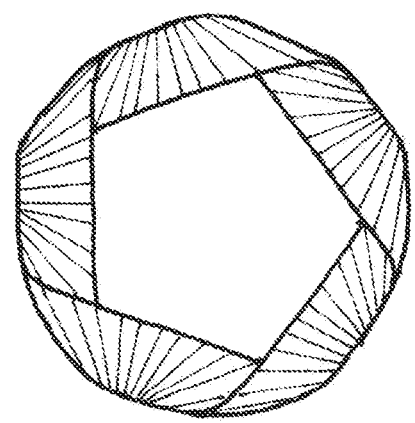
FIG. 1H—Five-half twisted right-handed Mobius Strip shaped rotor/stator armature.

The present invention will now be described by referencing the appended figures representing preferred embodiments. Mobius Strips have many forms and variations of spatial embodiments and various numbers of twists (half-twists) and for the each number of half-twists there exist two isotopy classes, mirror images of one another, right-handed (or counterclockwise) and left-handed (or clockwise) Strips. Following are the examples of the Mobius Strip shapes that may comprise proposed electromagnetic motor rotors and/or stators armatures. One-half twisted right-handed Mobius Strip shaped rotor/stator armature (side view FIG. 1A and top view FIG. 1B), two-half twisted right-handed Strip shaped rotor/stator armature (FIG. 1C), three-half twisted right-handed Mobius Strip shaped rotor/stator armature (FIG. 1D), one-half twisted left-handed Mobius Strip shaped rotor/stator armature (FIG. 1E), different three dimensional embodiments of three-half twisted Mobius Strips shaped rotor/stator armature: right-handed (FIG. 1F) and left-handed (FIG. 1G), five-half twisted right-handed Mobius Strip shaped rotor/stator armature (FIG. 1H). Armature may have a shape of Mobius Strip of any number of half-twists or any topologically equivalent surface.

Simplified versions of the Mobius Strip can be represented mathematically in multiple ways. In Cylindrical Polar Coordinates (r, θ, z) an unbounded version of the one-half twisted Mobius Strip can be represented by the equation:

$$\log(r)\sin(\theta/2) = z\cos(\theta/2).$$

In three dimensional Cartesian Coordinates: x=horizontal Cartesian Area Coordinate, y=vertical Cartesian Area Coordinate, z=vertical Cartesian Space Coordinate, R=radius of the center circle, θ=angle on the center circle, w=width of the Strip, s=distance from the center circle, positive and negative, t=thickness of the Strip, – the parametric representation of the one-half twisted Mobius Strip area:

$$x = R\cos(\theta) + \cos(\theta/2)\cos(\theta)s - \sin(\theta/2)\cos(\theta)t/2$$

$$y = R\sin(\theta) + \cos(\theta/2)\sin(\theta)s - \sin(\theta/2)\sin(\theta)\cos(2\theta)t/2$$

$$z = R\sin(\theta/2)s + \cos(\theta/2)t/2$$

(between s=−w/2 and s=+w/2 and between θ=0 and 2π)

Figure 2C:
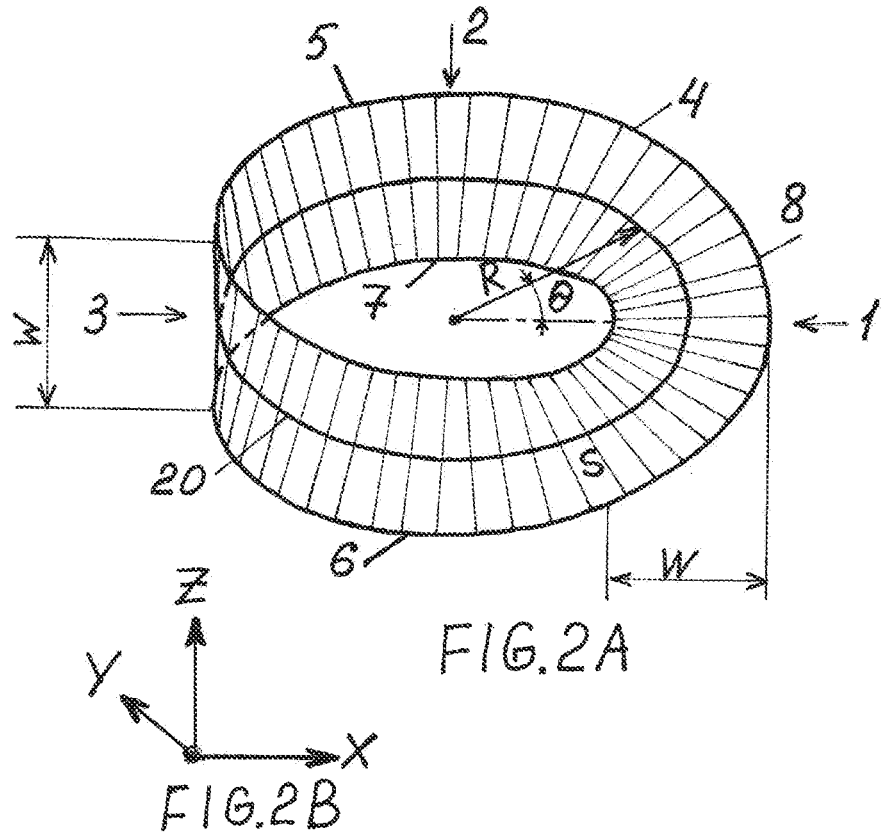
FIG. 2C—Parameterization formula.

FIG. 2A. For the purpose of the clarity of demonstration and simplicity of the preferred embodiments description, we will use parameterized Mobius Strip with the width w far greater than the thickness t. We assume that t→0 and will use the Mobius Strip shapes that can be represented parametrically in three dimensional space Cartesian Coordinates (FIG. 2B) by formula (1) (FIG. 2C), though other modifications may be used. In the formula (1): n—is the number of half-twists, w—is the Strip width, R—is the radius of the center circle 20 of the Strip. (The multiple times-twisted Mobius Strip shaped wheels are essentially repeated half-twisted shapes and the algorithm of operation is essentially the same. It is clearly evident in a linear versions of the proposed electromagnetic motor, where twisted rotors and/or stators are in a shape of cut and unfolded mobius strip, that, depending on the nature of the strip, could be represented by double helix curve (cylindrical, conical, parabolical, hyperbolical, or other helical curve), or double spherical spiral, or double 3-D embedded logarithmic spiral, Archimedian spiral, or other 3-D space embedded double spiral. In the original version of the Mobius Strip cut and unfolded Mobius Strip is a twisted rectangular strip with the same amount of twists/revolutions, that matches a cylindrical double helix; and half-twisted Mobius Strip corresponds to a half-pitch of the double helix). For the purpose of describing the current preferred embodiment we will use n=1, one half-twisted Mobius Strip (FIG. 2A). The characters on the view are: 1 is the direction of the front view, 2 is the direction of the top view, 3 is the direction of the rear view, 4 is the Mobius Strip edge, 5 is the top part of the edge and 6 is the bottom part of the edge, 7 is the inner part of the edge and 8 is the outer part of the edge (in some embodiment options armature may be placed upside down and the bottom and top parts of the edge will change to the opposites, however the inner and outer parts of the edge will remain the same).

Figure 3:
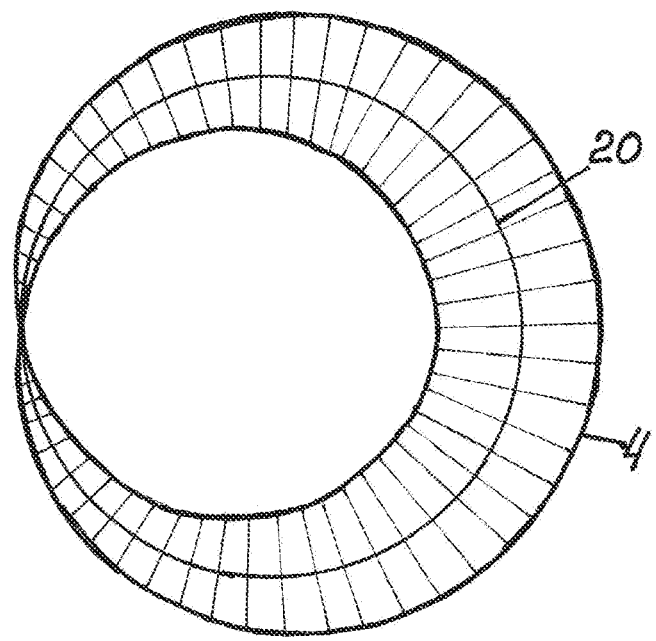
FIG. 3—Mobius Strip shaped armature. Top (bird's eye) view.
Figure 4:
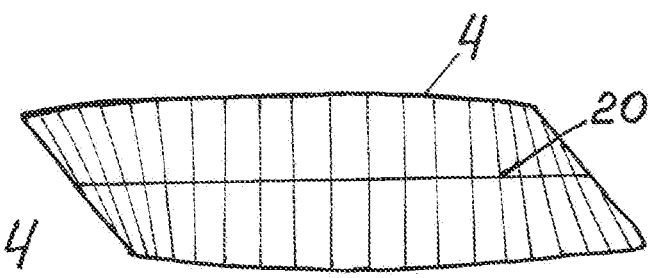
FIG. 4—Mobius Strip shaped armature. Rear view.
Figure 5:
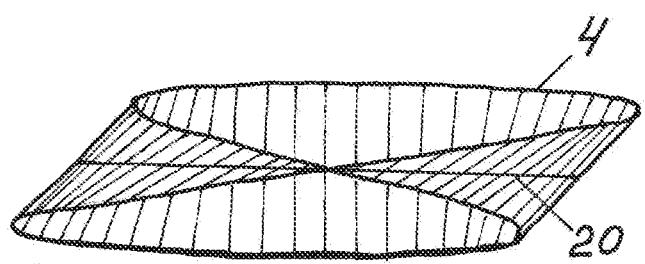
FIG. 5—Mobius Strip shaped armature. Front view.

Assorted views of the Mobius Strip surface allow us to recognize its geometrical and topological features that are essential in realizing the invention potential. FIG. 3 shows the top view of the Mobius Strip armature. FIG. 4 shows the rear view of the Mobius Strip armature. FIG. 5 shows the front view of the Mobius Strip armature (according to directions on FIG. 2A). The twist distributed around the circle of the Strip surface along with the geometry of the Mobius Strip edge provide conditions which, when the plurality of the permanent magnets placed in the right way on the armature surface, create magnetic forces interactions that will produce continuous, 100% efficient mechanical rotation.

Figure 6A:
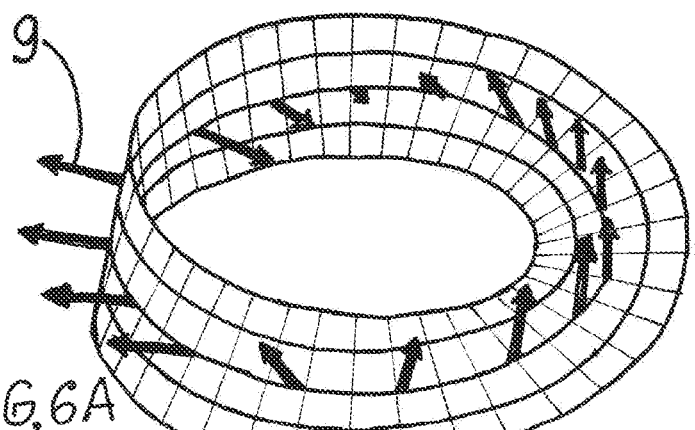
FIG. 6A—Mobius Strip surface normal vector.
Figure 6B:
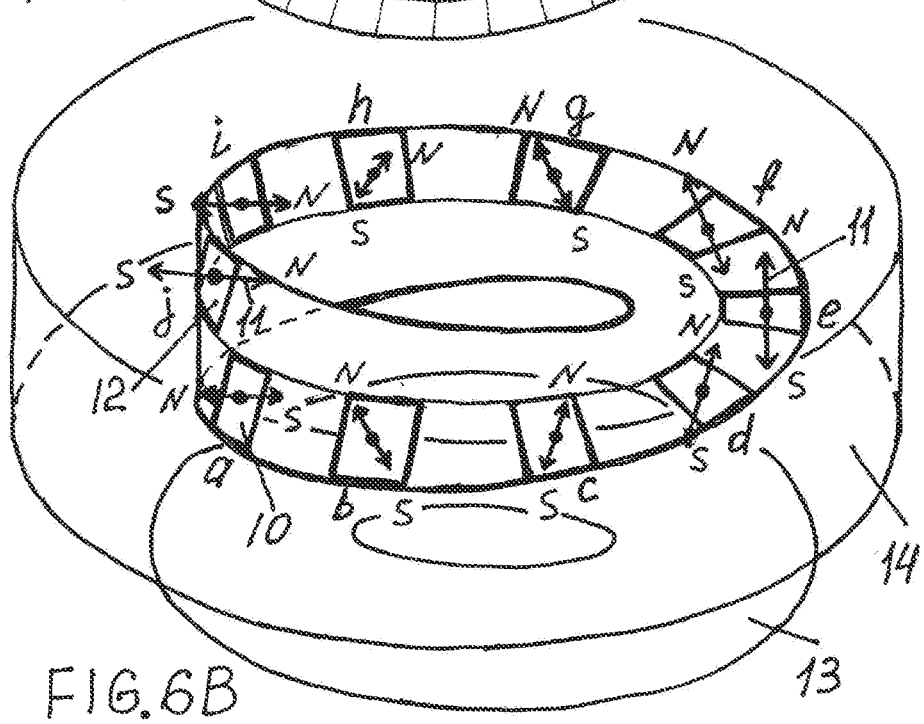
FIG. 6B—Mobius Strip surface exemplary magnets placement.
Figure 6C:
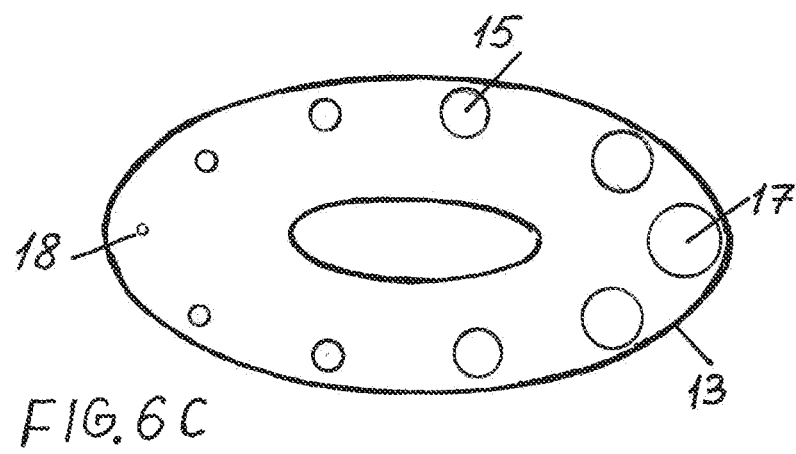
FIG. 6C-Magnetic force interaction gradient in axial direction.
Figure 6D:
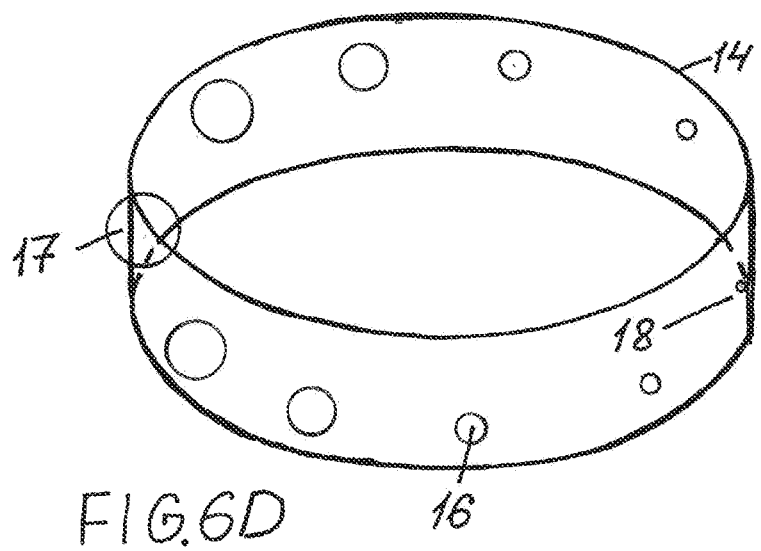
FIG. 6D—Magnetic force interaction gradient in radial direction.

The example of the one-half twisted Mobius Strip shaped rotor armature (it may be a rotor armature or a stator armature example) is on the FIG. 6A. In mathematical terms we say that the presented Mobius Strip surface is non-orientable. The main feature of the non-orientable surface is that we cannot define the surface normal at any given point and to extend it to the whole surface. The image on FIG. 6A illustrates how a given surface normal vector 9 changes its direction to the opposite when "sliding" along the Strip surface. Now we place permanent magnets along the outer part of the armature edge (the exemplary magnets placement on FIG. 6B), starting with the magnet a (character 10)—north magnetic pole facing out. As we place the magnets moving along the armature surface (magnets from a to j) the vector of magnetic flux of the magnet (character 11) changes its direction, as we move around the shape, up to the opposite (magnet j—character 12). When the opponent armature (stator) placed axially (character 13) or radially (character 14) relative to the rotor armature, the reflection of the magnetic flux vector magnitude on the opponent armature surface is gradually changing from maximum to minimum (and/or vice versa), creating a gradient of the potential magnetic force interaction (depicted on FIG. 6C and FIG. 6D as circles of the different sizes—characters 15 and 16—from larger size 17 representing maximal reflection and smaller size 18 representing minimal reflection—up to zero). As a result of the Mobius Strip shaped armature geometrical features the reflections of the magnetic flux vector in axial and radial directions are essentially the same and create similar projected gradients of magnetic force. Thus, making it equally easy using axial, or radial, or combined stator/rotor embodiment options.

Figure 7A:
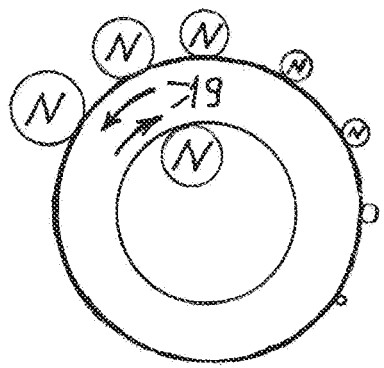
FIG. 7A—Magnetic interaction of magnetic force gradient with the opponent single magnet of the same polarity.
Figure 7C:
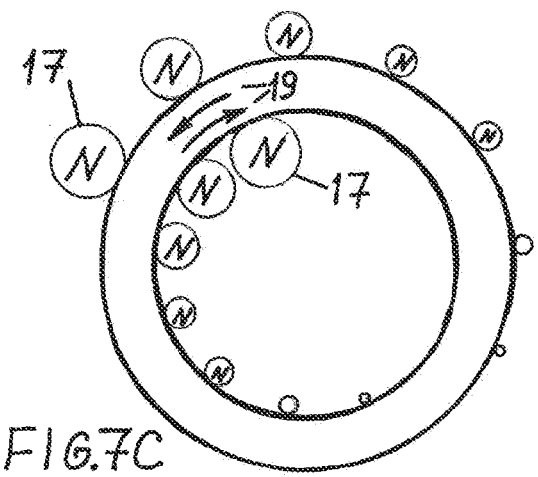
FIG. 7C—Magnetic interaction of magnetic force gradient with the opponent magnetic gradient of the same polarity.
Figure 7B:
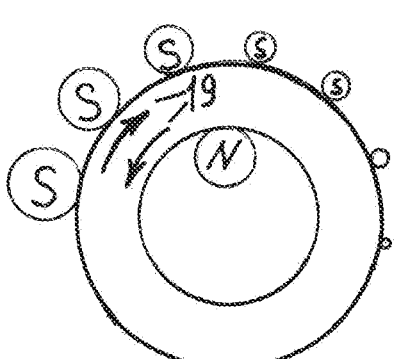
FIG. 7B—Magnetic interaction of magnetic force gradient with the opponent single magnet of the opposite polarity.
Figure 7D:
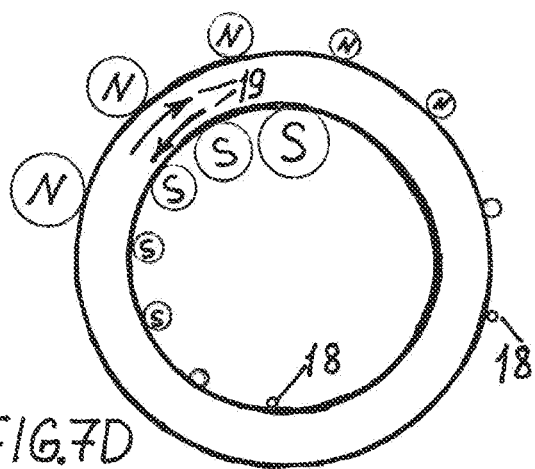
FIG. 7D—Magnetic interaction of magnetic force gradient with the opponent magnetic gradient of the opposite polarity.
Figure 7E:
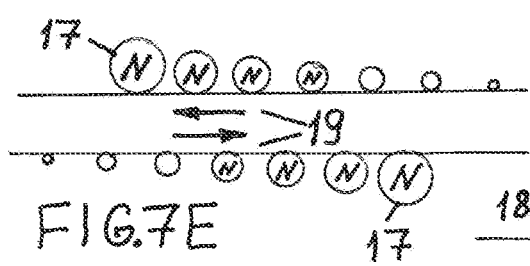
FIG. 7E—Linear interpretation of magnetic force interaction of the opponent magnetic gradients of the same polarity.
Figure 7F:
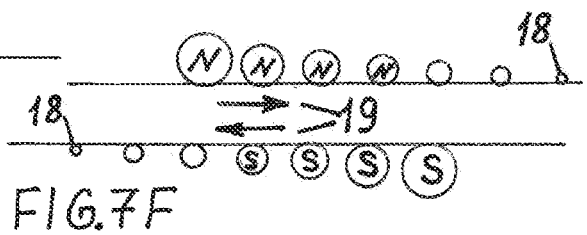
FIG. 7F—Linear interpretation of magnetic force interaction of the opponent magnetic gradients of the opposite polarity.

If one or more (or multitude) magnets placed on the opponent surface, the magnetic force gradient, projected from the Mobius Strip shaped armature surface, interacts with the opponent surface magnet (or magnets) and creates corresponding mechanical movement of one opponent armatures relative to the other. Figures from FIG. 7A to FIG. 7F present a schematic illustration of the said magnetic interaction of magnetic force gradient with the opponent single magnet of the same polarity (FIG. 7A), with the opponent single magnet of the opposite polarity (FIG. 7B), with the opponent magnetic gradient of the same polarity (FIG. 7C), and with the opponent magnetic gradient of the opposite polarity (FIG. 7D). Images on FIG. 7E and FIG. 7F represent linear interpretation of the said interaction of the opponent magnetic gradients of the same and opposite polarity respectively. We will use the linear interpretation for the simplified analysis and explanation. The directions of the corresponding mechanical movement of the opponent armatures marked with arrows (character 19). As seen on the images FIG. 7C, FIG. 7D, FIG. 7E, and FIG. 7F, gradients of the opposite directions create relative mechanical movement. In the same polarity gradients case, maximums 17 lead the way (FIG. 7C and FIG. 7E), mechanical movement created by the magnetic repulsion forces. In the opposite polarity case, minimums 18 lead the way (FIG. 7D and FIG. 7F), mechanical movement created by the magnetic attraction forces.

In general, when the same polarity gradients complete the moving cycle and the maximums 17 come closer to each other, the strong repulsion force slows down and/or stops further movement (FIG. 8A and FIG. 8C demonstrate that: FIG. 8A shows rotational interpretation, FIG. 8C shows linear interpretation). When the opposite polarity gradients complete the cycle and the maximums 17 come closer to each other, the strong attraction force slows down and/or stops further movement (FIG. 8B and FIG. 8D demonstrate that: FIG. 8B—rotational interpretation, FIG. 8D—linear interpretation).

The geometrical and topological features of the Mobius Strip shaped armature, along with the correct set up of the permanent magnets on the armature, allow to overcome the issue. It produces the effect of divergence-convergence around the balanced areas of the system and allows it to pass the equilibrium position, creating the conditions for the continuous movement. As we can see on FIG. 2A, FIG. 3, FIG. 4, and FIG. 5 the edge of the Mobius Strip armature (character 4) curves and the distance from the points of the edge and Strip surface in axial and radial directions relative to the Strip's middle circle (character 20) changes as we move along the edge/surface. The mathematical models of the magnetic force between two magnets show that the force is inversely proportional to the fourth power of the distance between the magnets (though some other models show that the force is inversely proportional to the distance squared). Empirically we have found that the magnetic force between two magnets is inversely proportional to the third power of the distance between the magnets. This implies that if the distance between the magnets is, for example, doubled then the magnetic force between them will decrease by about one order of magnitude.

Figure 9A:
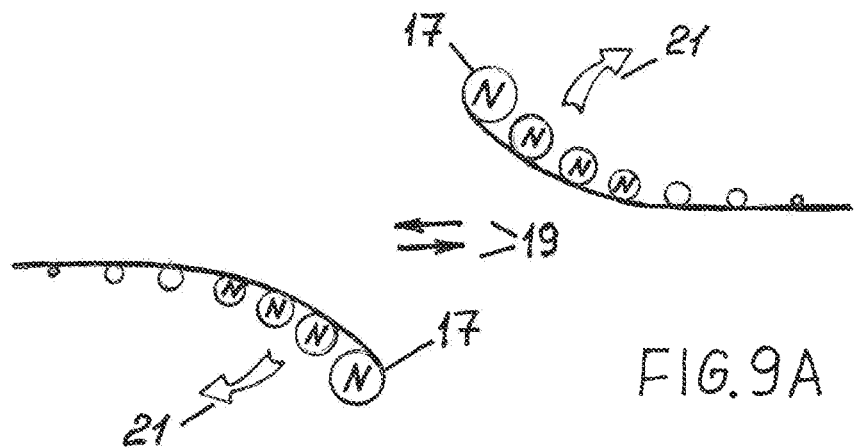
FIG. 9A—Divergence of the moving magnetic force gradients of the same polarity.
Figure 9B:
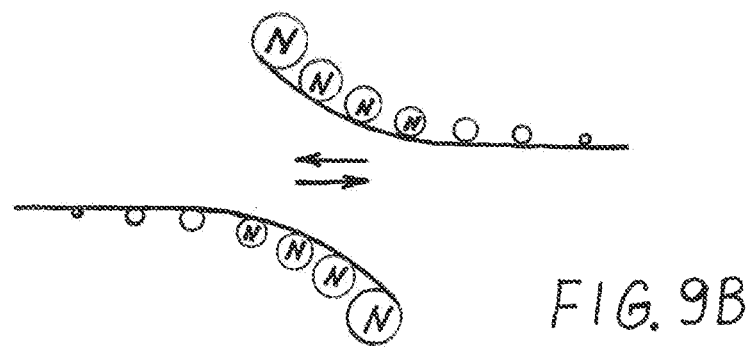
FIG. 9B—Avoiding strong equilibrium forces of the system with the same polarity gradients interaction.
Figure 9C:
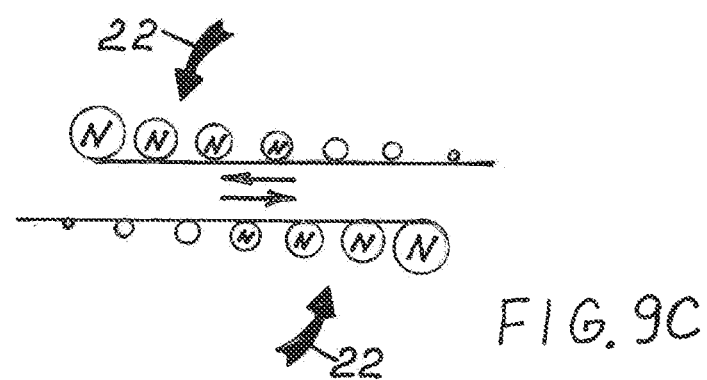
FIG. 9C—Convergence of the moving magnetic force gradients of the same polarity.
Figure 9D:
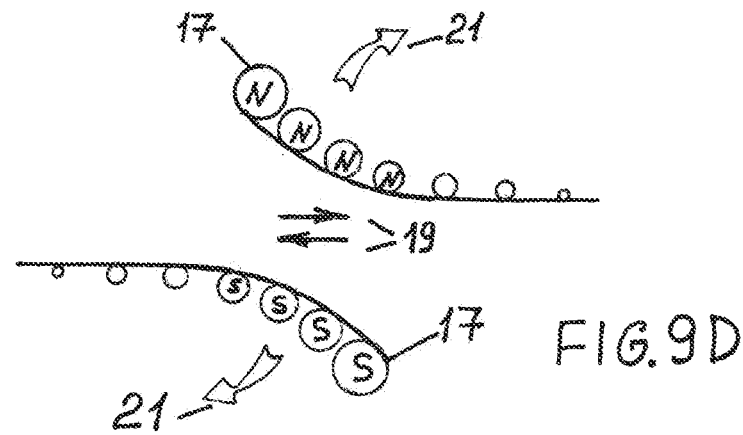
FIG. 9D—Divergence of the moving magnetic force gradients of the opposite polarity.
Figure 9E:
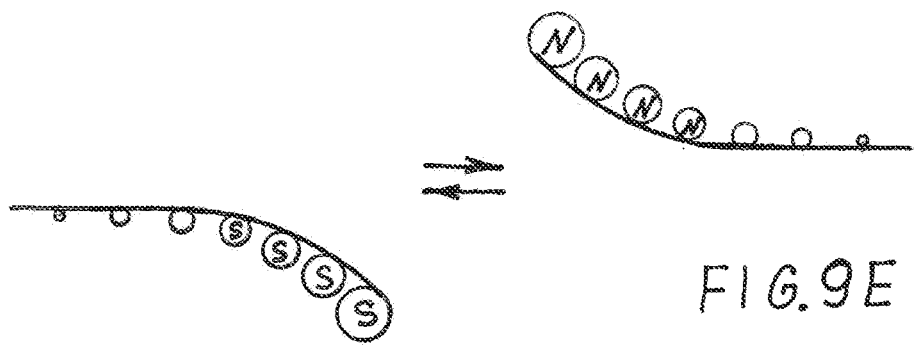
FIG. 9E—Avoiding strong equilibrium forces of the system with the opposite polarity gradients interaction.
Figure 9F:
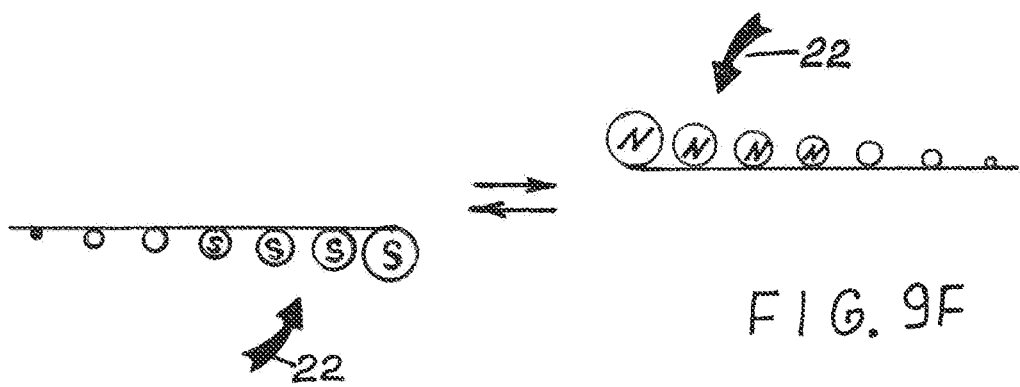
FIG. 9F—Convergence of the moving magnetic force gradients of the opposite polarity.

Figures from FIG. 9A to FIG. 9F present a schematic illustration of the divergence-convergence effect of the Mobius Strip shapes on the moving magnetic force gradients. When the gradients' maximums 17 (of the same—FIG. 9A, or of the opposite—FIG. 9D, polarity) approaching each other the distance between Mobius Strip shaped armatures parts, where maximums are located, increases, creating divergence effect (arrows 21), preventing their repulsion (or attraction) and avoiding strong equilibrium forces that would act against the directional movement (FIG. 9B and FIG. 9E). At the same time forces that create directional movement weaken as well. That is where and when other parts of the embodiment take over and support the continuous movement for the time of the divergence-convergence period that happens at this location of the system. When the system passes the possible equilibrium position the opposite parts of the armature come closer to each other creating an effect of convergence (arrows 22) and gradients resume full interaction again (FIG. 9C and FIG. 9F). At this time other parts of the embodiment pass through the divergence-convergence stage.

Figure 10A:
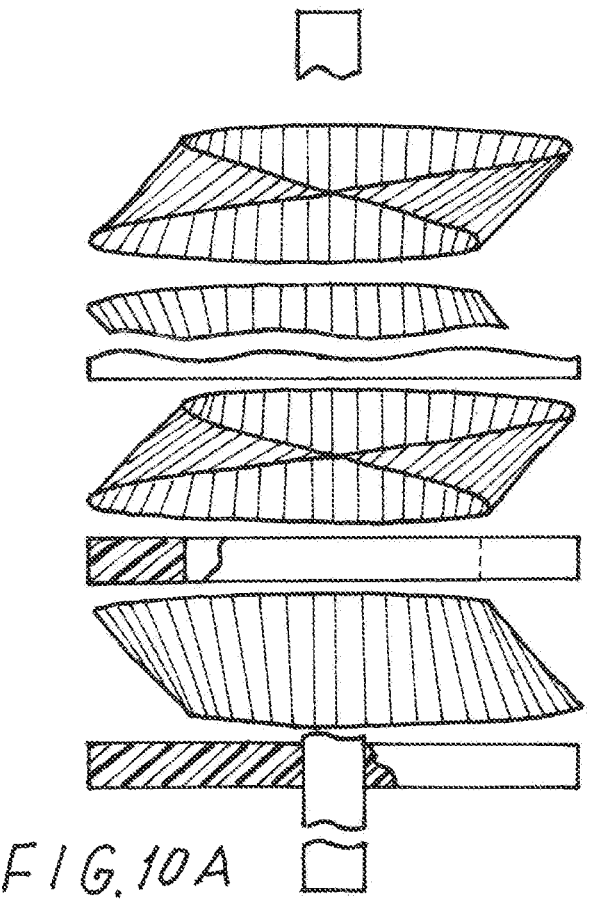
FIG. 10A—Axial configuration of the rotors and stators arrangement.
Figure 10B:
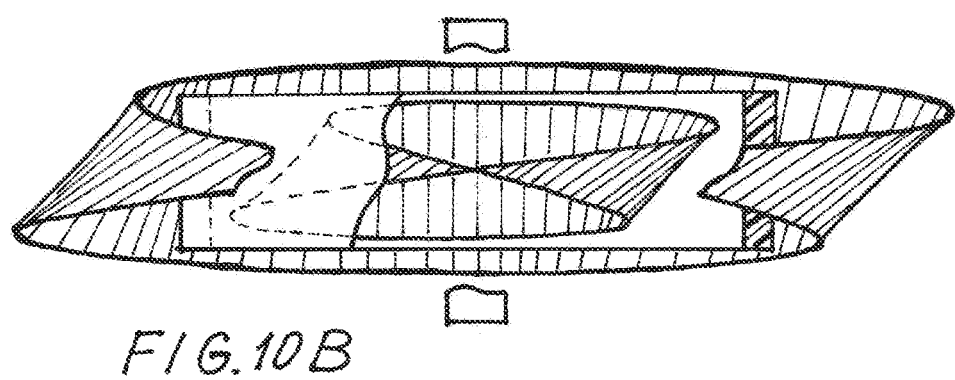
FIG. 10B—Radial configuration of the rotors and stators arrangement.
Figure 10C:
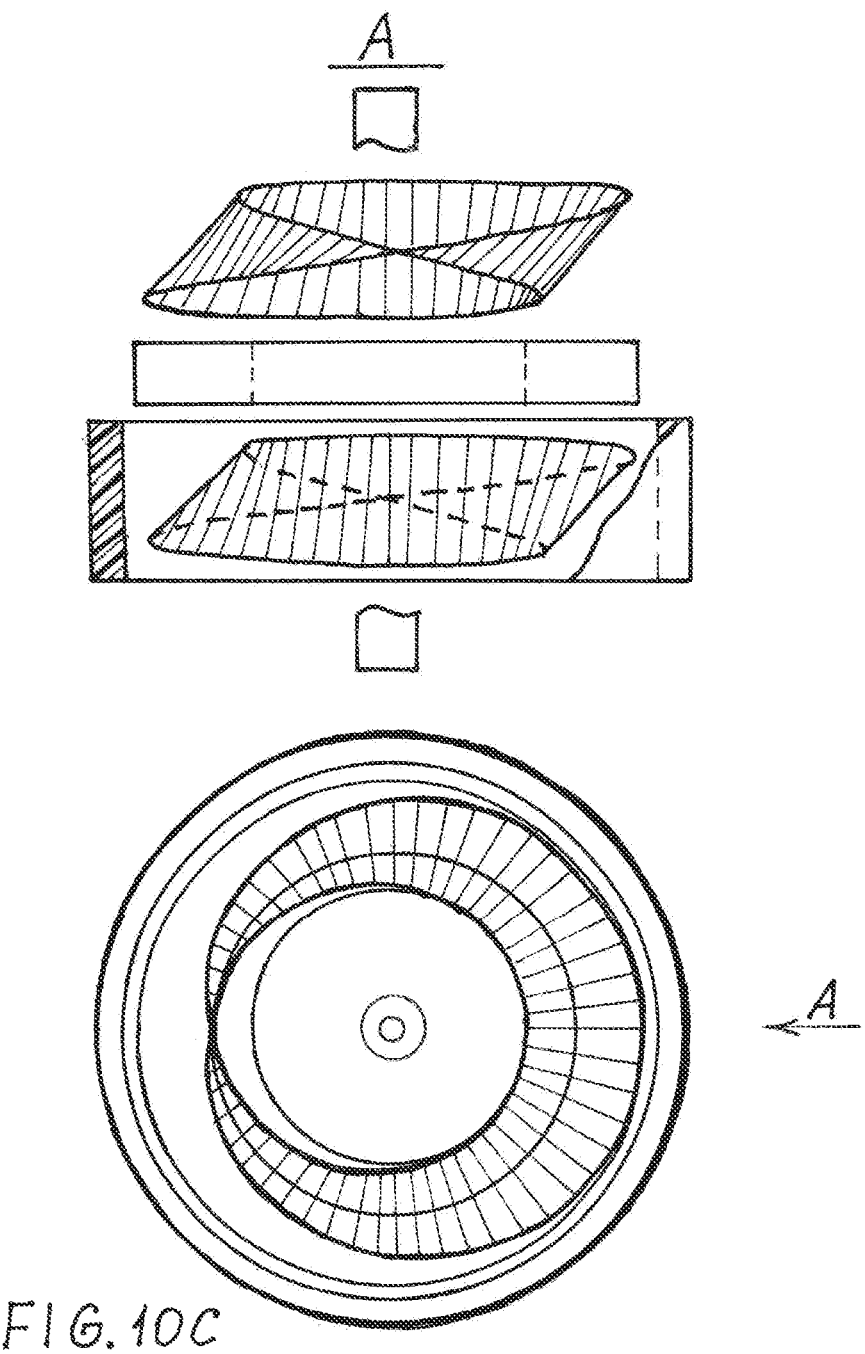
FIG. 10C—Combined radial and axial configuration of the rotors and stators arrangement.

The arrangement of the electromagnetic motor embodiment may include different amounts and sequences of rotors and stators. Further, the arrangement of the motor may include sequence of the alternating stators and rotors or may consist of the sequences of basic units. ("Basic unit" of proposed electromagnetic motor is a collection of rotors and stators working in synchronized way to achieve continuous rotation (or linear movement—in a linear version of the motor). One or more basic units may constitute the proposed electromagnetic motor). Some of the stators and rotors armature have Mobius Strip shapes and some of the stators and/or rotors may have disk shapes (solid disk, annulus, hoop, hollow cylinder, and other disk shapes). In case of basic units sequence arrangement, the basic unit of the embodiment may include different amounts and sequences of rotors and stators, situated on one or different shafts. The stators and rotors may interact in radial direction, or in axial direction, or in the combination of both and thus the options of the embodiments may include axial configuration of the rotors and stators arrangement (FIG. 10A), radial configuration (FIG. 10B), or combined radial and axial configuration (FIG. 10C). As one of the options, the basic unit may include one rotor and two stators or one stator and two rotors in order to cover full circle of rotation (or full one period of linear movement in case of linear configuration of the system) and to provide 100% efficient movement.

The arrangement of the magnets on the armature surfaces may have different configurations and cover full surface or parts of the surface of the armatures. Magnets may be placed on the Mobius Strip armature and on the disk armature symmetrically or asymmetrically (parallel to the central circle, along the edge, or according to the certain special layout. Moreover, magnets on the surface of the disk shaped armature may be placed mirroring or dependently to the shape of the surface and/or edge of the Mobius Strip shaped opponent armature by the parameterization formula or by the shape of the specific Mobius Strip) to adjust interaction of the magnets of the opponent parts in order to engage different reflections/projections of the magnetic flux vector and to modify the effectiveness of the system. Beside that, magnets may be of the same magnetic flux/force magnitude or of the varying in a certain way magnetic flux/force magnitude (including as an option, magnetic flux magnitude of the magnets on the disk shaped armature resemble the reflection of the magnetic flux vector from the twisted surface of the Mobius Strip shaped armature) for the same reasons. There is a correlation between the gap and/or gap/Strip width ratio and the magnitude of the system parts interaction. The size of the gap between rotors and stators armatures as well as the gap/Strip width ratio may be altered in order to regulate the magnitude of the system parts interaction.

Figure 11A:
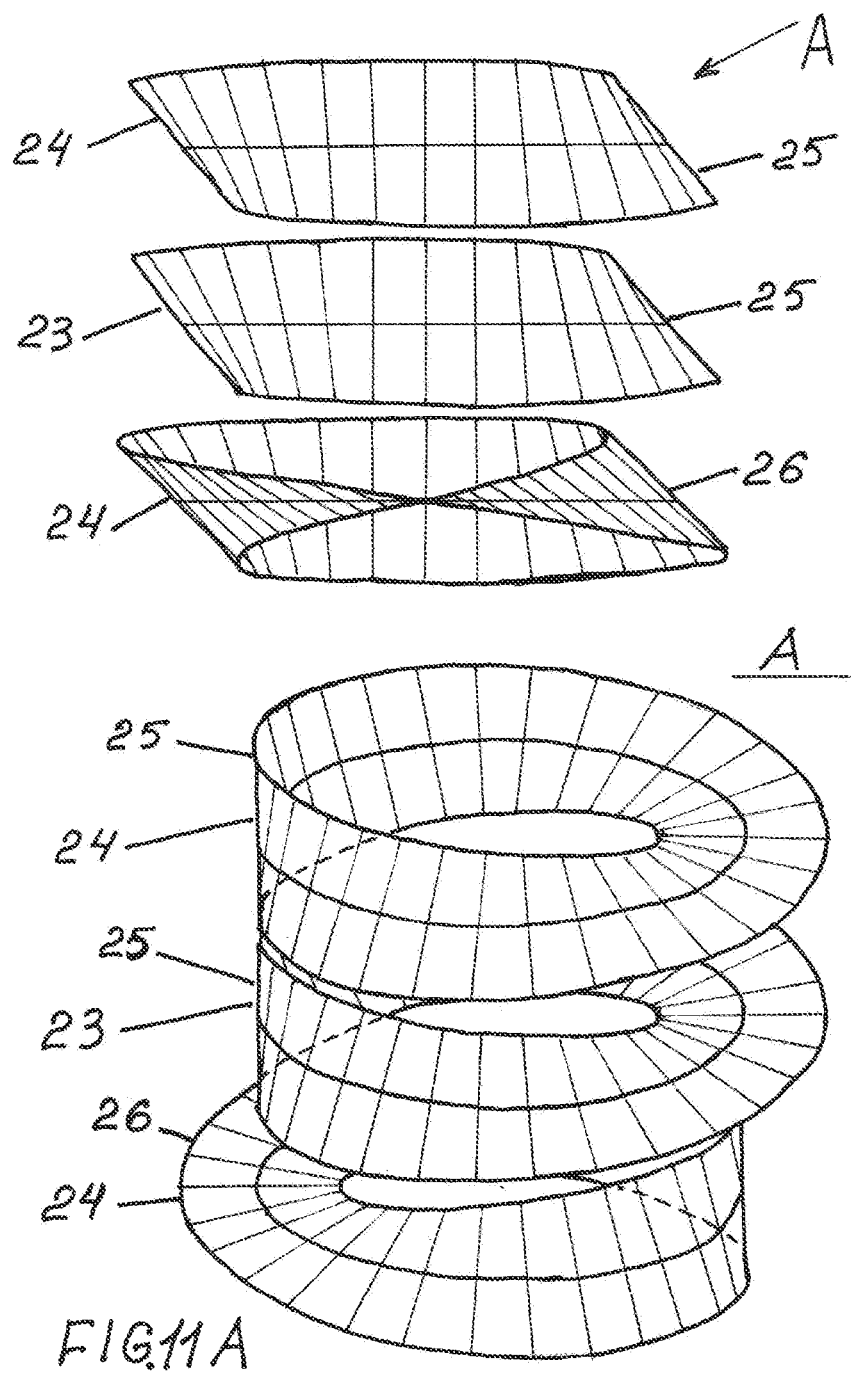
FIG. 11A—One rotor and two stators basic unit embodiment, one of the options.
Figure 11B:
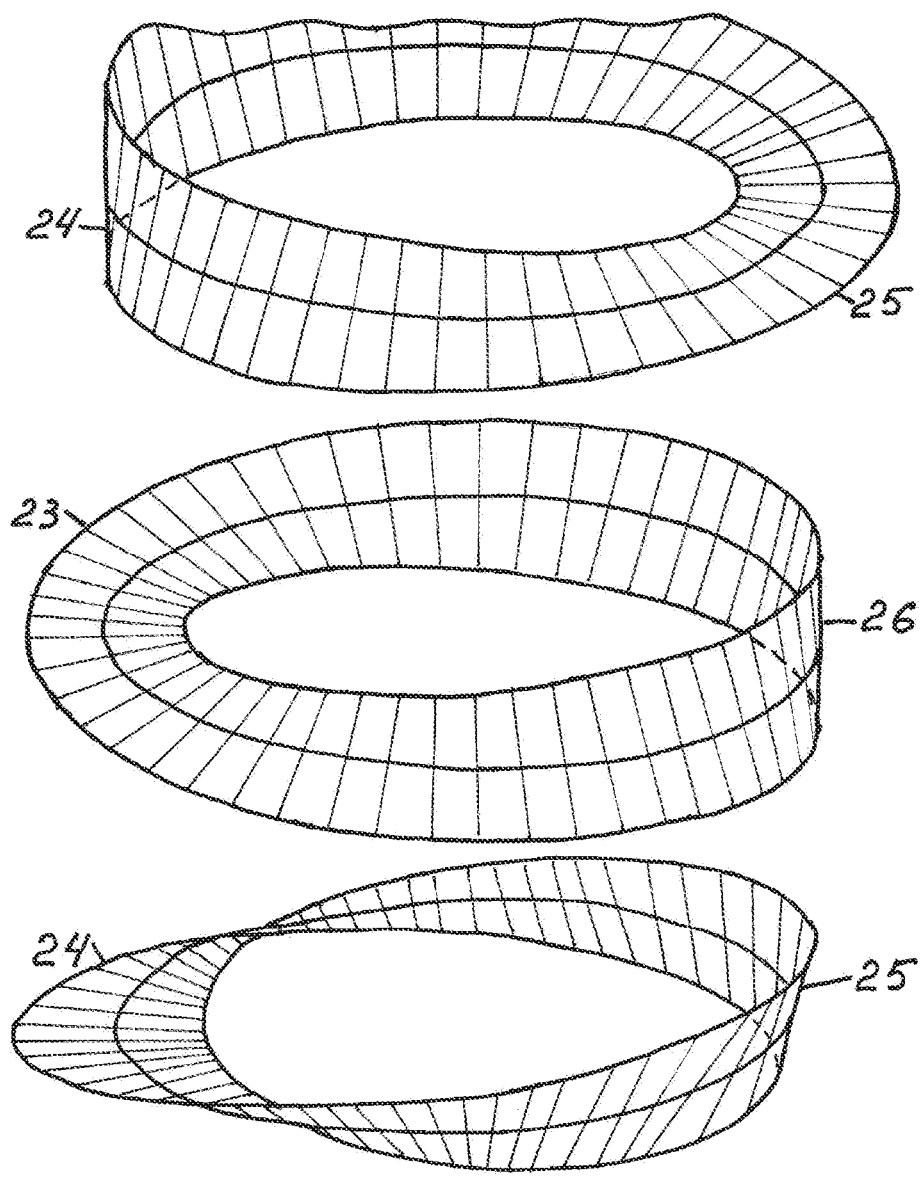
FIG. 11B—One rotor and two stators basic unit embodiment, one of the options.

The amount of possible workable arrangements of the sequences of Mobius Strip wheels shaped and disk shaped rotors and stators with magnets arrays is virtually endless. Even the amount of arrangements of basic units with one rotor and two stators sequences is very large. We will describe several possible preferred embodiments, though, the proposed Mobius Strip wheel shaped rotors and stators create a great variety of possible electromagnetic motor embodiments. For the simplicity and visuality we will start for the preferred embodiment with the basic unit that includes one rotor and two stators, situated axially relative to each other (Figures from FIG. 11A to FIG. 11C). The rotor (character 23) is located between the two stators (characters 24). The rotor and stators armatures have a Mobius Strip shaped armature. The shape of the armatures may be of the same or opposite isotopy classes (right-handed/counterclockwise twisted or left-handed/clockwise twisted) in various combinations. FIG. 11A shows a combination of right-handed Mobius Strip (character 25) shaped rotor and right-handed Mobius Strip (character 25) shaped and left-handed Mobius Strip (character 26) shaped stators. FIG. 11B shows a combination of left-handed Mobius Strip 26 shaped rotor 23 and two right-handed Mobius Strip 25 shaped stators 24.

Figure 11C:
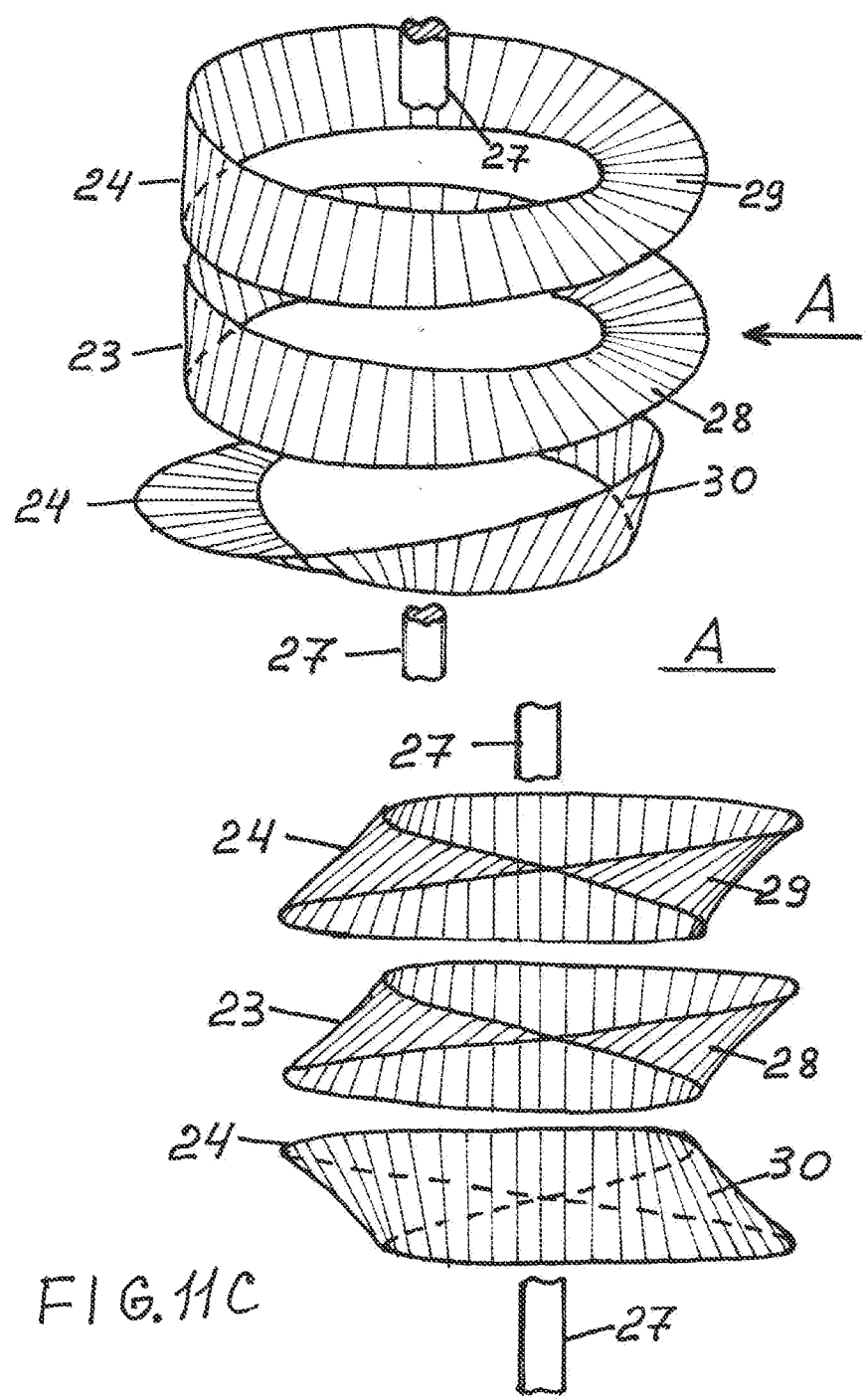
FIG. 11C—One rotor and two stators basic unit embodiment, one of the options.

The relative isotopy of the stators and rotors may influence the way the plurality of magnets arranged on the armature surfaces (and vice versa). In one of the preferred embodiments the rotor and two stators armature have a shape of the counterclockwise Mobius Strips of the same size (FIG. 11C). Rotor 23 is attached to the main axial shaft (character 27). Both stators 24 connected to the same axial shaft. The main shaft supports a rotor armature (character 28) for rotational movement with respect to the stators. The stators armatures (top stator armature characters 29 and bottom stator armature 30, as shown) are connected to the main shaft in the way that allows the rotor armature to transmit rotational motion to the main shaft and to be axially movable with respect to the shaft and the rotor. The stators armatures can be moved axially by a hydraulic, electromechanical, manual, or other actuator means connected to a lever or other means, which allows to turn the system on and/or off and to regulate the magnitude of stator-rotor pare/pares interaction. In our prototype we used lead screw actuators for that matter.

Figure 12A:
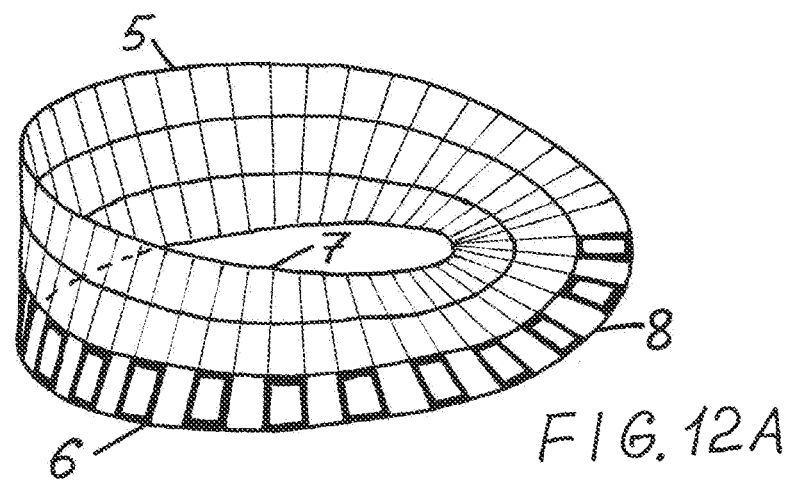
FIG. 12A—Magnets arrangements on the Mobius Strip shaped stators armature along the bottom edge of the Strip.
Figure 12B:
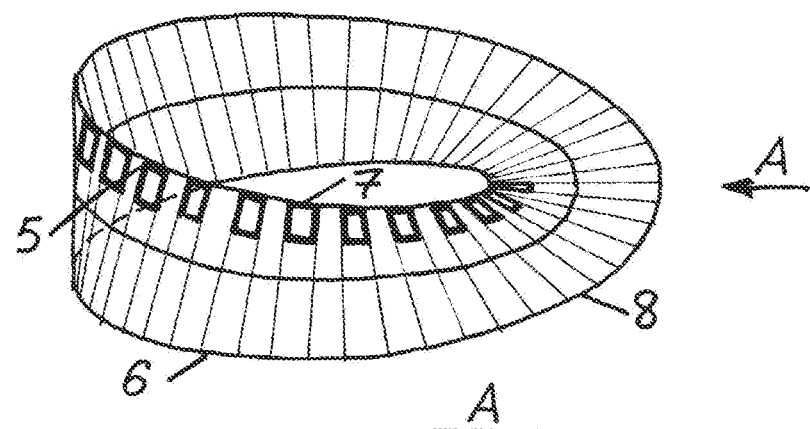
FIG. 12B—Magnets arrangements on the Mobius Strip shaped stators armature along the top edge of the Strip.
Figure 12B:
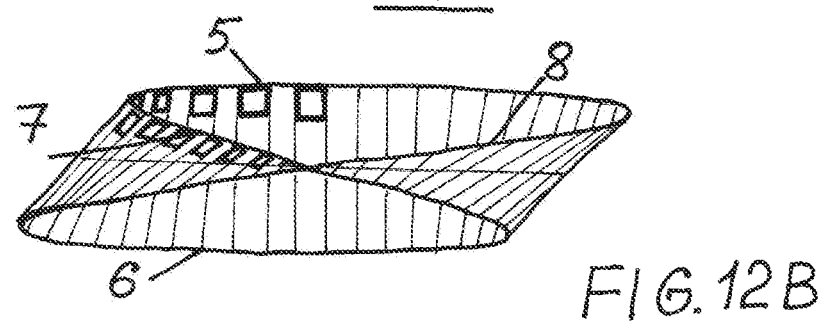

The rotor armature may include a plurality of magnets positioned along the Mobius Strip edge. The stators armatures may include a plurality of magnets (FIG. 12A and FIG. 12B) positioned along the edge of the stators Mobius Strips on the parts of the Strip edge nearest to the rotor, covering continuously 180° of the bottom (FIG. 12A, character 6) or the top (FIG. 12B, character 5) edge of the Strip respectively. The plurality of magnets arrangement may include outer 8 and/or inner 7 part of the Strip edge.

Figure 13A:
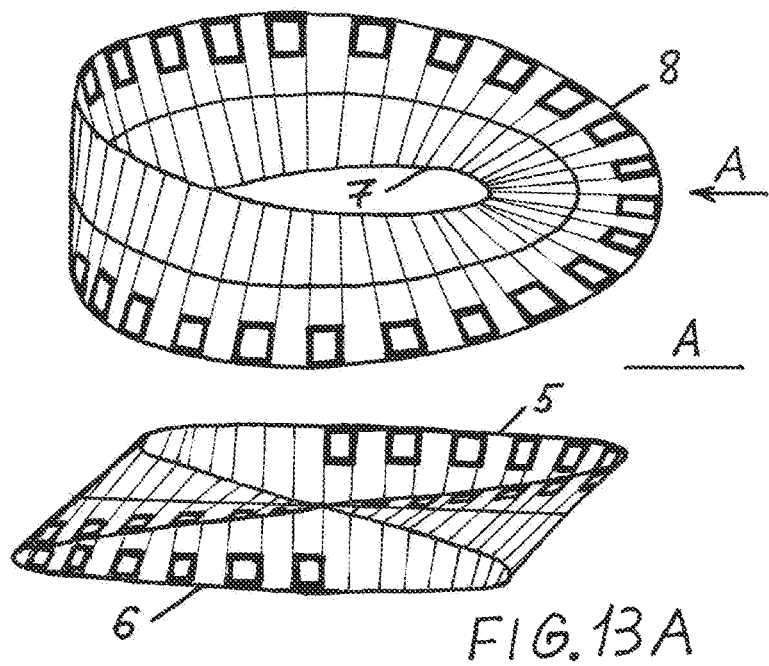
FIG. 13A—Magnets arrangement on the Mobius Strip shaped rotor in one continuous sequence along the bottom and top edge of the Strip.
Figure 13B:
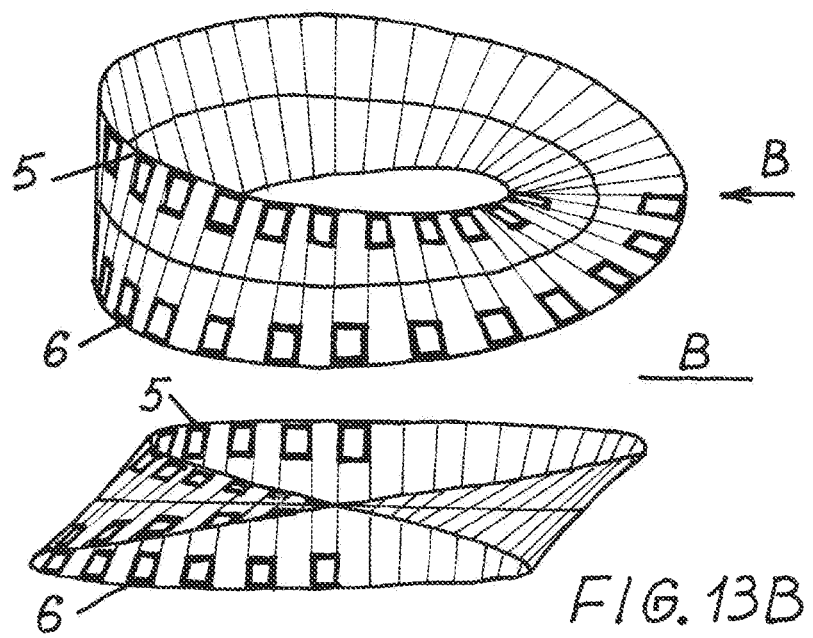
FIG. 13B—Magnets arrangement on the Mobius Strip shaped rotor in two separate sequences along the bottom and top edge of the Strip.
Figure 13C:
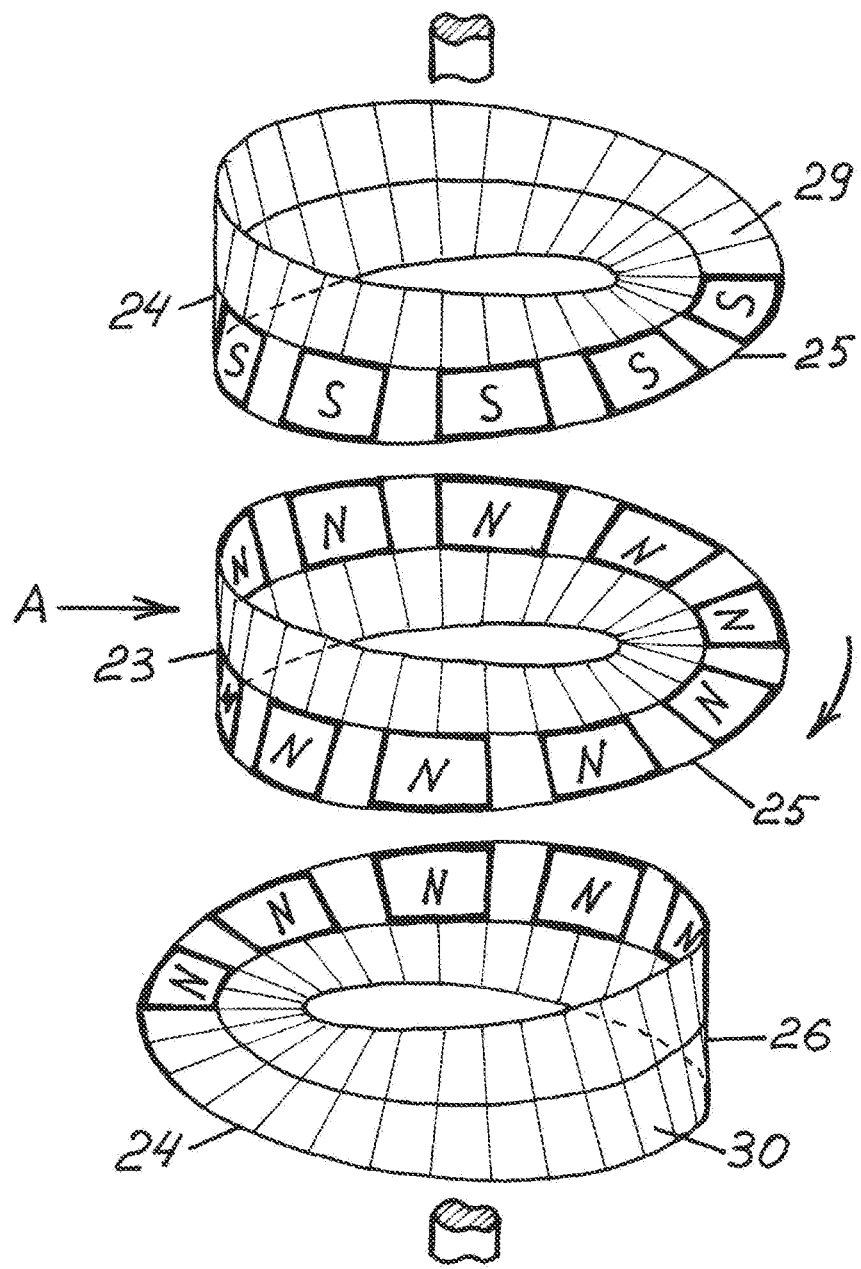
FIG. 13C—An example of the continuous sequence distribution of the magnets on the right-handed rotor in the combination with two stators of different isotopy, isometric view.
Figure 13D:
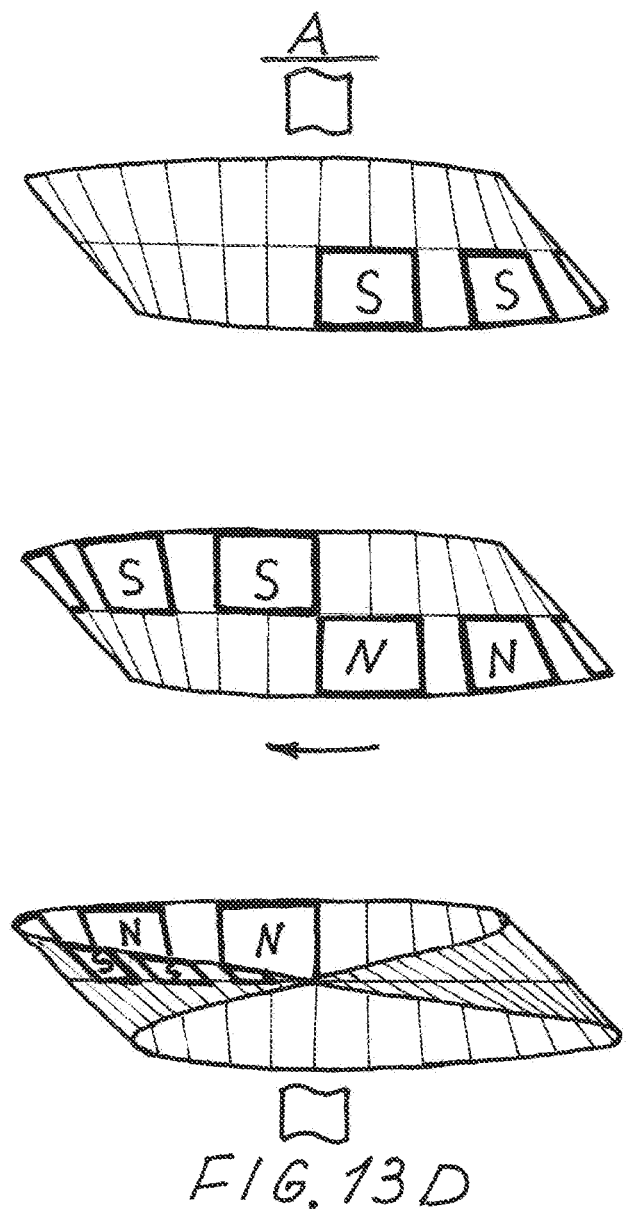
FIG. 13D—An example of the continuous sequence distribution of the magnets on the right-handed rotor in the combination with two stators of different isotopy, side view.
Figure 13E:
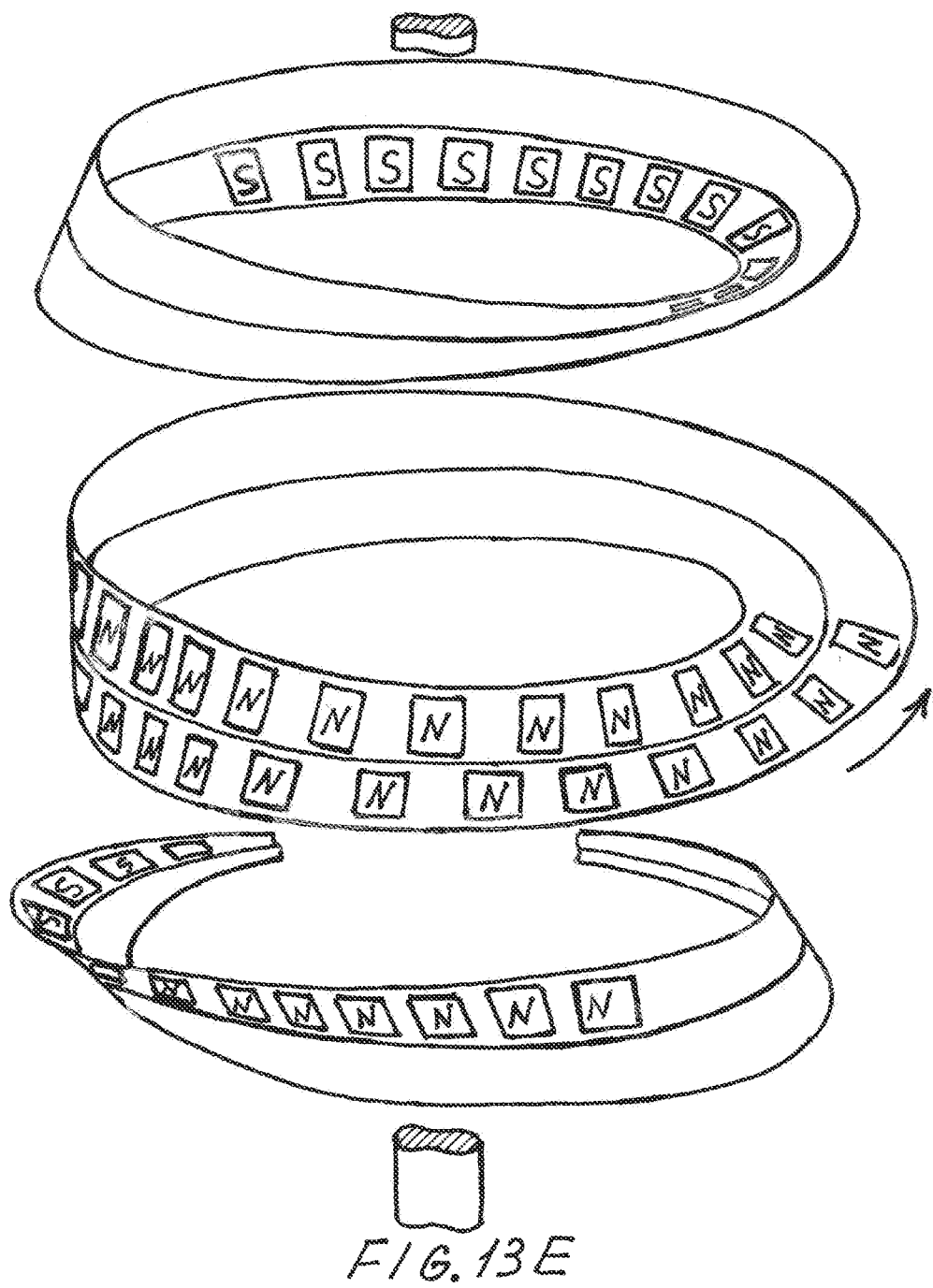
FIG. 13E—Two separate sequences arrangement of the magnets on the rotor armature of the basic unit preferred embodiment option.

There are various possible arrangements of the plurality of the permanent magnets along the rotor Mobius Strip edge. We will describe two of the many ways. One way is when magnets are distributed in one continuous sequence along the bottom and top edge of the Strip (this option may include the outer part of the Mobius Strip edge, as shown on FIG. 13A, or the inner part of the edge). The second way is when magnets are distributed in two separate sequences, one along the bottom edge 6 of the Strip (FIG. 13B) and another along the top edge 5 of the Strip on the same side of the Strip armature structure (FIG. 13B). FIG. 13C and FIG. 13D shows an example of the continuous sequence distribution of the magnets on the right-handed Mobius Strip 25 shaped rotor 23 in the combination with two stators 24 of different isotopy 25 and 26. For the preferred embodiment we will use two separate sequences arrangement of the magnets on the rotor armature (FIG. 13E).

The two stators are connected to the main shaft with the relative radial angle displacement of 180° in order to support rotor-stator paires interaction when each pair passes the divergence-convergence period respectively, thus ensuring the continuous rotation (FIG. 11C, FIG. 13C, FIG. 13D, and FIG. 13E). In the shown option with one continuous sequence of the distribution of plurality of the magnets along the Mobius Strip edge of the rotor (FIG. 13C and FIG. 13D), magnets array of one stator 29 are facing the rotor 23 magnets with the same polarity poles, while the magnets array of the second stator 30 are facing the rotor magnets with the opposite polarity poles, creating the continuous mechanical rotation due to the repulsion and attraction magnetic forces respectively. In the shown option of the alternative distribution of the magnets of the rotor, two separate sequences of the permanent magnets arrays of the rotor facing the stators magnets arrays of the same polarity (FIG. 13E) and create mechanical rotation due to the repulsion magnetic forces between rotor-stator pairs arrays. In both such arrangements the basic unit delivers continuous mechanical rotation of the rotor.

Another preferred embodiment of two stators/one rotor basic unit may include a rotor that is a left-handed (clockwise) mobius strip. One stator, situated radially to the rotor, is disk shaped in the form of the hollow cylinder concentric to the center circle of the rotor's mobius strip (it can be positioned inside the rotor's circle or outside the rotor; for this embodiment we will use disk shaped stator positioned outside of the rotor, encircling the rotor). Second stator is a right-handed (counterclockwise) mobius strip of the same size as the rotor's mobius strip positioned axially to the rotor (it can be positioned on either side of the rotor in axial direction; for this embodiment we will position stator on the side of the rotor so that the inner edge of the rotor's mobius strip corresponds to the outer edge of the stator's mobius strip. Magnets are arranged on the rotor in one continuous sequence along the mobius strip edge, starting at the most inner spot in the counterclockwise direction to the most outer spot of the edge. Magnets may have any standard shape (round, rectangular, etc.) and may be arranged with or without gaps between them. For this embodiment we may use magnets of rectangular shape distributed along the edge without gaps. Disk shaped stator includes one or more magnets arranged on the center circle of the shape or parallel to the center circle with the space between the magnets (if more than one magnet used) greater than the dimensions of the magnets in the circular direction; magnets of the stator face magnets of the rotor with the same polarity. Mobius strip wheel shaped stator may have a sequence of rectangular magnets distributed along the half of the length of the outer edge of the strip, starting at the most outer spot in the clockwise direction (corresponding to the inner edge of the rotor) without space between magnets; magnets of the stator face magnets of the rotor with the same polarity. In order to reduce the effect of the possible equilibrium even more, the last eighth of the sequence of the rotor's magnets array are gradually offset from the outer edge toward the center circle of the strip, or gradually weaker, or both.

Another preferred embodiment with two stators/one rotor basic unit may include two disk shaped stators in the form of solid disks or in the form of annuli and rotor in the form of half-twisted mobius strip of either of two isotopy classes, located axially between the stators. Magnets on the rotor may be distributed in one continuous sequence along the bottom and top edge of the rotor's strip, or in two separate sequences, one along the bottom edge of the rotor's strip and another along the top edge on the same side or opposite sides of the rotor's strip armature structure. In order to simplify the enablement of the embodiments we will employ for these embodiments the magnets arrangements similar to the previous one. For the rotor's mobius strip armature we may use permanent magnets of rectangular shape distributed along the edge without gaps. Disk shaped stators include one or more magnets arranged on the center circle of the shape or concentric to the center circle with the space between the magnets (if more than one magnet used) greater than the dimensions of the magnets in the circular direction. Magnets on stators may face magnets on the rotor: 1) both with the same polarity or opposite polarity, or 2) one with the same polarity and another with opposite polarity. The isotopy class and distribution of the magnets on the rotors armature will dictate the magnet(s) placement on the stators' armatures. As an example of this group of embodiments we will use right handed mobius strip wheel shaped rotor with two separate sequences of magnets arrays, one distributed along the bottom edge of the rotor's strip and another along the top edge on the same side of the rotor's strip armature structure (the sequences start at the mobius strip surface perpendicular to the axis and end at the mobius strip surface parallel to the axis; the last eighth of the sequences of the rotor's magnets array are gradually offset from the outer edge toward the center circle of the strip, or gradually weaker, or both). Magnets on the stators face magnets on the rotor with the opposite polarity. The two stators, ceteris paribus, are situated with the relative radial angle translation of 180°.

Other basic unit embodiments may include one rotor and one stator, or two rotors and one stator, or one rotor and three stator, as well as other sets of the basic unit rotors and stators. The proposed electromagnetic motor may include various sequences of rotors and stators different from the basic units arrangement version, as mentioned before. The main purpose of rotors and stators armature in the proposed electromagnetic motor is to provide the surface/3-D space support for the arrays of magnets mounted on the armatures and to not interfere with the magnets of rotor(s) and stator(s) interaction and performance. For this matter rotor and stator armature should be made from a non-ferromagnetic material and preferably from dielectric/non-conductor material (in order to eliminate possible eddy current and back electromotive force). The rotors/stators shape twists correspond to the relative magnetic flux phase twist and shift and distance offset of the magnets arranged on the shapes and create conditions for the successful interaction of the magnets arrays. Thereby another embodiment may include stators and/or rotors magnets arrays that arranged with the relative phase twists and shifts and assembled together accordingly. In such case stators/rotors armatures are not exactly necessary and present virtually to guide the magnets spatial orientation.

Any of the described preferred embodiments (and not described particularly here, because, as we mentioned above, there is a vast amount of possible embodiments of the proposed electromagnetic motor) may be considered for the best mode of invention, because the exact embodiment may depend on the particular use of the invention (it can be used instead of batteries in small devices such as cellphones, flashlights, small appliances, or as a source of rotational motion or instead of batteries in large devices and/or machines such as electric cars or power tools/appliances, or to produce electricity on a larger scale, or in linear interpretations as a source of linear motion/transportation etc.). However in order to disclose the best mode in this application we will choose for the best mode the embodiment described in the paragraph [0053]. The best mode of the proposed electromagnetic motor is based on the embodiment of the basic unit that is two stators/one rotor basic unit and may include two disk shaped stators in the form of annuli and rotor in the form of a half-twisted right-handed mobius strip, located axially between the stators. For the rotor's magnets arrangement we may use magnets of rectangular shape distributed along the edge of the mobius strip armature without gaps in two separate sequences of magnets arrays, one distributed along the bottom edge of the rotor's strip and another along the top edge on the same side of the rotor's strip armature structure (the sequences start at the mobius strip surface that is perpendicular to the axis and end at the mobius strip surface that is parallel to the axis; the last eighth of the sequences of the rotor's magnets array are gradually offset from the outer edge toward the center circle of the strip). Both sequences' magnets arranged with the same polarity toward the outside direction from the rotor's armature. Disk shaped stators magnets arranged on the center circle of the shape with the space between the magnets greater than the dimensions of the magnets in the circular direction and face magnets on the rotor with the opposite polarity utilizing attraction forces to produce rotational movement. The two stators, ceteris paribus, are situated with the relative radial angle translation of 180°. Rotor is attached to the main axial shaft. Both stators connected to the same axial shaft. The main shaft supports a rotor armature for rotational movement with respect to the stators. The stators armatures are connected to the main shaft in the way that allows the rotor armature to transmit rotational motion to the main shaft and to be axially movable with respect to the shaft and the rotor. The stators armatures can be moved axially by any actuator means, for example, lead screw actuator, which allows to turn the system on and/or off and to regulate the magnitude of stator-rotor pare/pares interaction.

Figure 14:
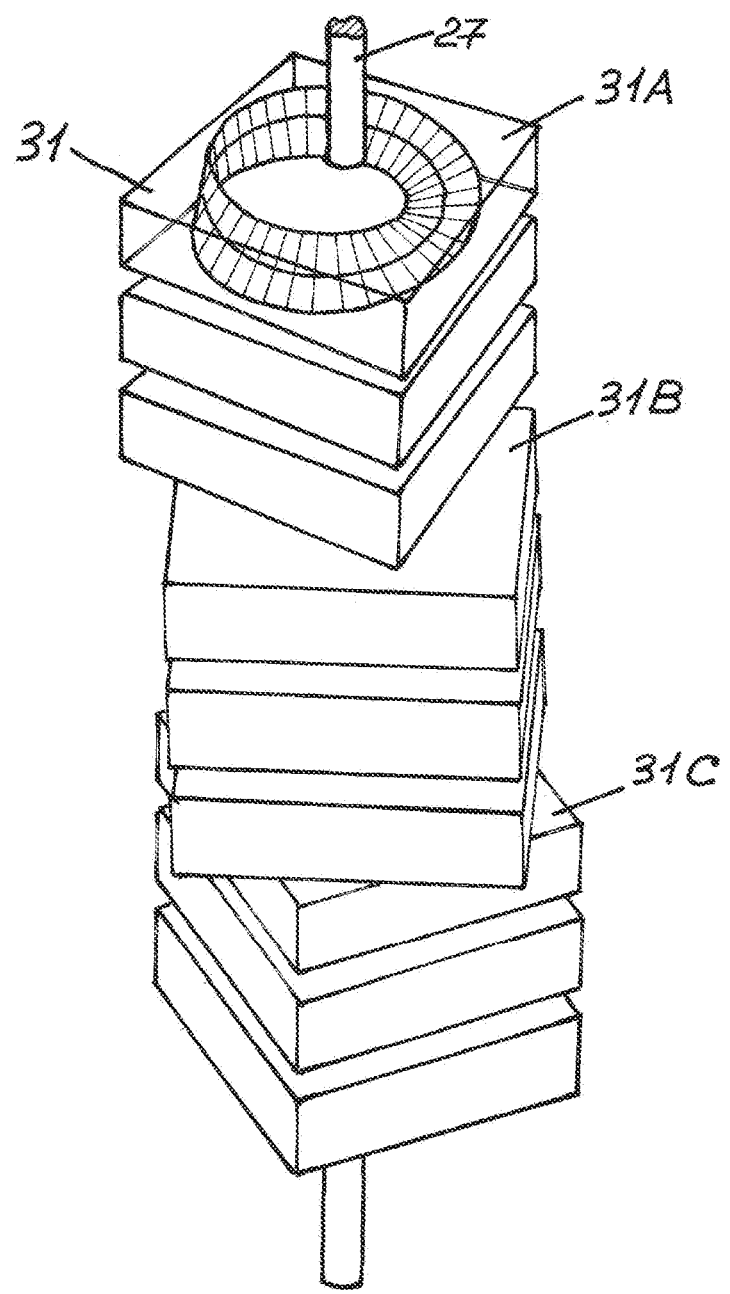
FIG. 14—The preferred embodiment basic units arrangement options.

FIG. 14. In order to provide strong and smooth continuous rotation of the motor shaft 27 we will use for the preferred embodiment three basic units 31 that radially displaced 120° relative to the shaft and each other, covering the whole 360° turnover around the axis of the shaft (characters 31A, 31B, and 31C). More basic units may be used to provide even smoother and stronger rotation, stabilized speed and torque.

Figure 15:
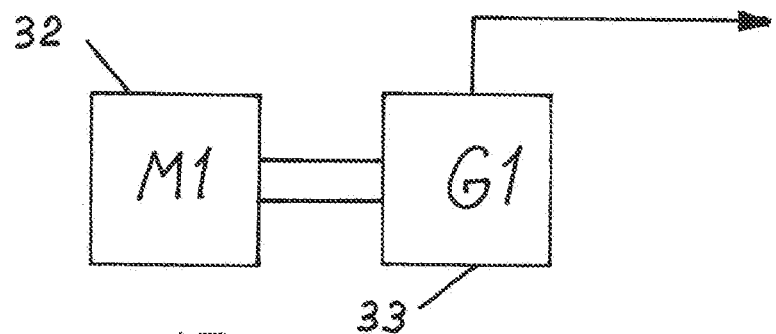
FIG. 15—Primary electromagnetic motor is connected to the electric generator to create electricity.

FIG. 15. The proposed electromagnetic motor with magnets can provide rotative force strong enough to power 5-20 KW electric generator. In continuation and within the present invention idea we connect electromagnetic motor powered by magnets (character 32) to the electric generator (AC or DC) (character 33) and create electricity.

Now, with this electricity we can empower a much larger secondary electromagnetic motor that is the part of the present invention—the magnetic motor (FIG. 16A) of the same Mobius Strip shape of the stators and/or rotors, but we will use much stronger electromagnets, about one order of magnitude stronger than the magnets used in the primary magnetic motor. As one of the options for the preferred embodiment of the secondary motor we may use the same Mobius Strip armature for the stators 24 and rotor 23, one Mobius Strip armature 28 rotor and two Mobius Strip armature 29 and 30 stators of the greater size than the primary motor construction, that corresponds to the electromagnets 34 (FIG. 16B) of the greater power and the greater mechanical motion output. For the simplicity of the embodiment we will use electromagnets 34 for the stators armatures (FIG. 16B and FIG. 16C) and permanent magnets for the rotor armature (in order to eliminate the need of the electric power transition system to the rotor), however electromagnets may be used for the rotor arrangement as well.

Figure 17:
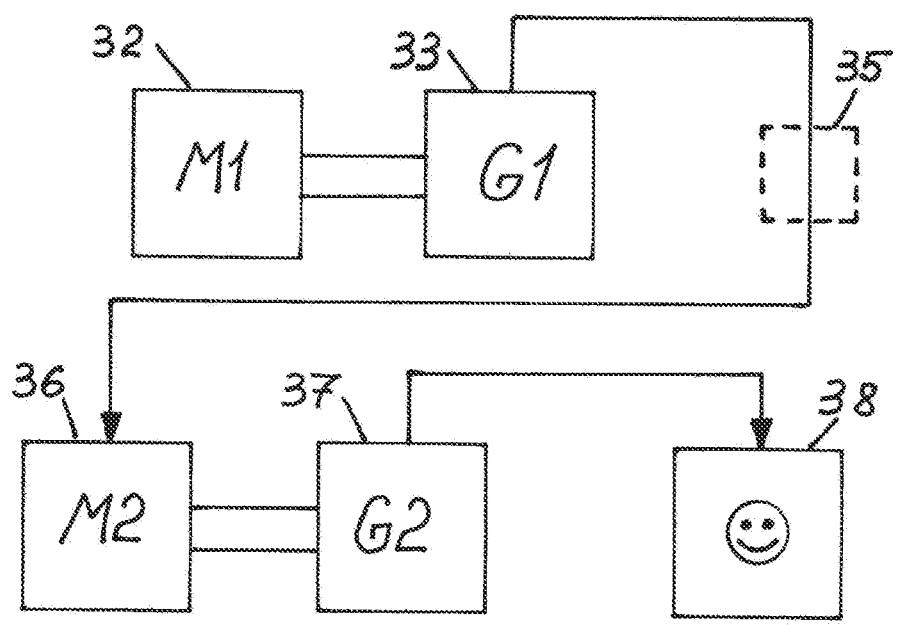
FIG. 17—Electric power generating system powered by the primary and secondary electromagnetic motors.

Now we have an electromagnetic motor with Mobius Strip shaped stators and/or rotors powerful enough to provide necessary rotational force to up to 100 kW plus electric generator (FIG. 17). Independent power plant includes primary electromagnetic motor (character 32), electric generator (character 33), (rectifier, character 35, if needed), secondary electromagnetic motor (character 36), power plant electric generator (character 37), and the consumer of the electric power (character 38).

This power plant can create electric power strong enough to power several residential houses or to be used in agricultural or commercial applications. No connection to the grid is necessary.

What is claimed is:

1. An electromagnetic motor comprising: a plurality of rotating (rotor) components and stationary (stator) components that are in one of the wheel shape and a disk shape, wherein the wheel shaped components are formed by twisted cylinders, such as mobius strips and/or paradromic rings, and the disk shaped components are formed by solid disks, annuli, hoops, hollow cylinders; wherein a one plurality of magnets arranged on the components of one of said rotor and said stator, and an another plurality of magnets arranged on the components of the other of said rotor and said stator.

2. An electromagnetic motor as in claim 1, wherein said rotor components and said stator components are wheel-shaped said wheel shaped rotor and stator respective components are half-twisted mobius strips of same or opposite isotopy classes.

3. An electromagnetic motor as in claim 2 wherein said wheel shaped rotor components and said stator components are mobius strips and are arranged around one shaft in sequences of alternating groups of stators and rotors.

4. An electromagnetic motor as in claim 2 wherein said wheel shaped rotor components and said stator components are mobius strips and arranged in sequences of different or similar basic units situated on one main shaft or on different shafts, connected to the main shaft, wherein said basic unit comprises at least one rotor and one stator arranged around one shaft in axial, or radial, or in a combination of axial and radial directions.

5. An electromagnetic motor as in claim 4 wherein said basic unit comprises two stators and one rotor.

6. An electromagnetic motor as in claim 5 wherein said two stators and one rotor situated axially between said two stators; wherein said one rotor is attached to the shaft in a way that shaft supports the rotor for the rotational movement with respect to the stators and the stators are connected to the shaft in a way that allows the rotor to transit rotational motion to the shaft and the stators to be axially movable with respect to the shaft and the rotor.

7. An electromagnetic motor as in claim 6 wherein said two stators and one rotor are counterclockwise mobius strips of the same size; the two stators are connected to the main shaft with the relative radial angle translation of 180°; the two stators armatures comprise a plurality of magnets positioned along the edge of the stators mobius strips on the parts of the strip edge nearest to the rotor, covering continuously 180° of the edge of the strip; the rotor comprises a plurality of magnets distributed in two separate sequences on the rotor's strip surface, one along the bottom edge of the strip and another along the top edge of the strip on the same side of the strip armature structure; the two separate sequences of the magnets arrays of the rotor facing the stators magnets arrays with the same polarity.

8. An electromagnetic motor as in claim 5 wherein said one rotor is a left-handed mobius strip; one of the two stators is situated radially to the rotor and is disk shaped in a form of hollow cylinder concentric to the center circle of the rotor's mobius strip, positioned outside of the rotor, encircling the rotor; second stator is a right-handed mobius strip of the same size as the rotor's mobius strip positioned axially to the rotor on the side of the rotor so that the inner edge of the rotor's mobius strip corresponds to the outer edge of the stator's mobius strip; the magnets are arranged on the rotor in one continuous sequence along the mobius strip edge, starting at the most inner spot in the counterclockwise direction to the most outer spot of the edge, distributed along the edge without gaps; the last eighth of the sequence of the rotor's magnets array are gradually offset from the outer edge toward the center circle of the rotor's strip; the disk shaped stator comprises one or more magnets arranged on the center circle of the shape or parallel to the center circle with the space between the magnets greater than the dimensions of the magnets in the circular direction, the magnets of the stator face the magnets of the rotor with the same polarity; the mobius strip wheel shaped stator comprises a sequence of magnets distributed along the half of the length of the outer edge of the strip, starting at the most outer spot in the clockwise direction, corresponding to the inner edge of the rotor, without space between the magnets, the magnets of the stator face magnets of the rotor with the same polarity.

9. An electromagnetic motor as in claim 6 wherein said one rotor is a right-handed mobius strip and the stators are disk shaped in the form of annuli; the magnets of rectangular shape distributed along the edge of the rotor's mobius strip armature without gaps in two separate sequences of magnets arrays, one distributed along the bottom edge of the rotor's strip and another along the top edge on the same side of the rotor's strip armature structure; the sequences start at the mobius strip surface that is perpendicular to the axis and end at the mobius strip surface that is parallel to the axis; the last eighth of the sequences of the rotor's magnets array are gradually offset from the outer edge toward the center circle of the strip; the magnets of both said sequences arranged with the same polarity toward the outside direction from the rotor's armature; the disk shaped stators comprise one or more magnets arranged on the center circle of the shape or concentric to the center circle with the space between the magnets greater than the dimensions of the magnets in the circular direction; the stators' magnets face magnets on the rotor with the opposite polarity; the two stators are situated with the relative radial angle translation of 180°.

10. An electromagnetic motor as in claim 4 wherein said sequence of basic units comprises three basic units situated on one shaft and radially displaced with the radial angle of 120° relative to the shaft and each other.

11. An electromagnetic motor as in claim 1 wherein said magnets are electromagnets or a combination of electromagnets and permanent magnets.

12. An electric power generating system comprising a primary electromagnetic motor with stators and rotors in the form of disks and mobius strip shaped wheels and magnets arrays arranged on said stators and rotors, wherein said primary electromagnetic motor is connected to an electric generator to create electricity; and a secondary electromagnetic motor with stators and rotors in the form of disks and mobius strip shaped wheels and electromagnets arrays or combination of electromagnets and permanent magnets arrays arranged on said stators and rotors, wherein said electromagnets are empowered by the electricity created by the generator connected to the primary electromagnetic motor; the secondary electromagnetic motor is connected to a power plant electric generator to create electricity for electric power consumers.

* * * * *